(12) United States Patent
Nishikawa et al.

(10) Patent No.: US 9,391,309 B2
(45) Date of Patent: Jul. 12, 2016

(54) CONNECTED POROUS SHEET AND METHOD FOR PRODUCING THE SAME, SEPARATOR FOR NON-AQUEOUS SECONDARY BATTERY, AND NON-AQUEOUS SECONDARY BATTERY, AND METHOD FOR PRODUCING THE SAME

(75) Inventors: Satoshi Nishikawa, Iwakuni (JP); Hiroki Sano, Iwakuni (JP); Takashi Yoshitomi, Iwakuni (JP)

(73) Assignee: TEIJIN LIMITED, Osaka (JP)

( * ) Notice: Subject to any disclaimer, the term of this patent is extended or adjusted under 35 U.S.C. 154(b) by 408 days.

(21) Appl. No.: 13/882,652

(22) PCT Filed: Oct. 21, 2011

(86) PCT No.: PCT/JP2011/074338
§ 371 (c)(1),
(2), (4) Date: May 21, 2013

(87) PCT Pub. No.: WO2012/060231
PCT Pub. Date: May 10, 2012

(65) Prior Publication Data
US 2013/0236767 A1    Sep. 12, 2013

(30) Foreign Application Priority Data

Nov. 1, 2010  (JP) ................................ 2010-245693
Aug. 2, 2011  (JP) ................................ 2011-169610

(51) Int. Cl.
*H01M 2/16*   (2006.01)
*H01M 10/052*   (2010.01)
(Continued)

(52) U.S. Cl.
CPC .............. *H01M 2/162* (2013.01); *H01M 2/145* (2013.01); *H01M 2/1653* (2013.01); *H01M 2/1673* (2013.01); *H01M 2/1686* (2013.01);
(Continued)

(58) Field of Classification Search
CPC ........................................................ H01M 2/16
See application file for complete search history.

(56) References Cited

U.S. PATENT DOCUMENTS

| | | | | |
|---|---|---|---|---|
| 5,580,676 | A | * | 12/1996 | Honda et al. ................... 429/131 |
| 2007/0148480 | A1 | * | 6/2007 | Ishiwata ................... B32B 7/12 |
| | | | | 428/473.5 |

(Continued)

FOREIGN PATENT DOCUMENTS

| | | |
|---|---|---|
| JP | 2003-346765 A | 12/2003 |
| JP | 2005-183594 A | 7/2005 |

(Continued)

OTHER PUBLICATIONS

JP 2009-218105 MT with Abstract.*
(Continued)

*Primary Examiner* — Patrick Ryan
*Assistant Examiner* — Alex Usyatinsky
(74) *Attorney, Agent, or Firm* — Sughrue Mion, PLLC

(57) ABSTRACT

An example of the present invention is provided with porous sheets 11, 21 each formed by layering a porous base material including a polyolefin and a heat-resistant porous layer including a heat-resistant resin. The porous sheets 11, 21, respectively, are connected at connecting regions 15a and 15b, 25a and 25b, respectively, which have been formed by thermal fusion of the heat-resistant porous layers facing each other by folding the sheets. Furthermore, the porous sheets 11, 21 are additionally connected at a connecting region 27 that has been formed by thermal fusion.

7 Claims, 3 Drawing Sheets

(51) Int. Cl.
*H01M 10/0566* (2010.01)
*H01M 2/14* (2006.01)

(52) U.S. Cl.
CPC ........ *H01M10/052* (2013.01); *H01M 10/0566* (2013.01); *Y02E 60/122* (2013.01); *Y10T 156/10* (2015.01); *Y10T 156/1062* (2015.01)

(56) References Cited

U.S. PATENT DOCUMENTS

2010/0068612 A1* 3/2010 Nishikawa ............ H01M 2/145
　　　　　　　　　　　　　　　　　　　　　429/129
2010/0173187 A1 7/2010 Nishikawa et al.
2011/0244304 A1* 10/2011 Shinyashiki ............ H01M 2/16
　　　　　　　　　　　　　　　　　　　　　429/139

FOREIGN PATENT DOCUMENTS

| | | |
|---|---|---|
| JP | 2006-59717 A | 3/2006 |
| JP | 2009-218105 A | 9/2009 |
| WO | 2008/062727 A1 | 5/2008 |
| WO | 2008/156033 A1 | 12/2008 |

OTHER PUBLICATIONS

Japanese Office Action for JP 2011-169610 dated Aug. 21, 2012.

* cited by examiner

CONNECTED POROUS SHEET AND METHOD FOR PRODUCING THE SAME, SEPARATOR FOR NON-AQUEOUS SECONDARY BATTERY, AND NON-AQUEOUS SECONDARY BATTERY, AND METHOD FOR PRODUCING THE SAME

CROSS REFERENCE TO RELATED APPLICATIONS

This application is a National Stage of International Application No. PCT/JP2011/074338 filed Oct. 21, 2011 (claiming priority based on Japanese Patent Application Nos. 2010-245693 filed Nov. 1, 2010 and 2011-169610 filed Aug. 2, 2011), the contents of which are incorporated herein by reference in their entirety.

TECHNICAL FIELD

The present invention relates to a connected porous sheet and a method for producing the same, separator for a non-aqueous secondary battery, and a non-aqueous secondary battery and a method for producing the same. In particular, the invention relates to a technique for connecting a porous sheet(s) provided with a porous base material including a polyolefin and a heat-resistant porous layer including a heat-resistant resin.

BACKGROUND ART

Conventionally known is a porous sheet provided with a porous base material including a polyolefin and a heat-resistant porous layer laminated on one surface or both surfaces of the porous base material by using a heat-resistant resin (for example, see Patent Document 1 and 2).

Patent Document 1 and 2 disclose non-aqueous secondary battery separators, in which a surface of a polyethylene microporous film has been coated with a heat-resistant porous layer composed of a heat-resistant polymer such as a wholly aromatic polyamide. In such separators, the polyethylene microporous film allows pores to close under high temperature. Thus, the separators have a function for blocking electric current to prevent thermal runaway of battery (shutdown function). Furthermore, in the separators, even if the polyethylene microporous film has been molten under high temperature conditions, the heat-resistant porous layer retains the shape thereof, which therefore can prevent short circuit between electrodes, thereby preventing accidents, such as thermal runaway and ignition of battery. In addition, a non-aqueous secondary battery having higher safety under high temperature can be provided.

Such a layered-type separator is used for layered-type batteries having a more flexible shape for use in mobile devices and the like and large-volume and large-size batteries for hybrid cars and the like.

From the viewpoint of the shape flexibility and increase in size, preferred is, for example, a layered-type battery, such as a layered-type battery in which a layered body including plural electrodes and separators laminated on each other has been wrapped in laminate packaging. However, in a battery having such as a laminate structure, due to an impact from outside the battery or the like can cause a shift between the electrodes and the separators, leading to the occurrence of short circuit. In view of such a concern, a layered-type battery is conventionally known in which electrodes individually have been housed in a separator formed into a pouch shape by folding the separator and bonding the ends thereof together by thermal fusion or the like to restrain movement of the electrodes (for example, see Patent Document 3).

Meanwhile, in ordinary production of battery, long and large electrode sheets and a separator are simultaneously sequentially conveyed and laminated to produce a battery element. In this case, for example, when a short separator is used, it is necessary to take measures, such as temporality stopping a production line in order to switch to a new separator in a short period of time or reducing the lengths of the electrode sheets to correspond to the length of the separator. Such measures lead to reduction in production efficiency of battery. In the situation as above, a method is thought to be effective, in which while continuing to operate the production line, the tip end of a new porous sheet is connected to the rear end of the porous sheet being conveyed, so that production line suspension is prevented. This method is preferable in that if the connecting can be accomplished by thermal fusion, processing is easy and simple.

PRIOR ART DOCUMENT

Patent Documents

[Patent Document 1] International Publication WO2008/062727
[Patent Document 2] International Publication WO2008/156033
[Patent Document 3] Japanese Patent Application Laid-Open (JP-A) No. 2009-218105

DISCLOSURE OF THE INVENTION

Problem to be Solved by the Invention

As described above, there has conventionally been proposed the technique for housing electrodes in a pouch-shaped separator. However, in the separator provided with the heat-resistant porous layer as described above, the presence of the heat-resistant porous layer has been thought to primarily make thermal fusion itself difficult. For the reason, no proposition has been made to use a separator having a heat-resistant porous layer for a layered-type battery. Accordingly, to date, no non-aqueous secondary battery separator has been proposed that has high safety under high temperature and can ensure safety required when used for a layered-type battery.

In addition, for a porous sheet provided with a heat-resistant porous layer, fusion itself has been thought to be difficult. Therefore, there has not been even an idea of connecting such sheets to each other to form into an elongated shape for continuous battery production. Thus, no technique has been established so far that enables continuous production so as to increase further production efficiency in battery production using a porous sheet provided with a heat-resistant porous layer.

The present invention has been accomplished in view of the above problems. Under such circumstances, first, a connected porous sheet is needed that has high safety under high temperature and has a continuous production suitability in the production process for products to improve production efficiency, and also a method for producing the connected porous sheet is needed. In addition, secondly, a non-aqueous secondary battery separator is needed that can be used for a layered-type battery formed by stacking a separator and electrodes on each other and ensures more safety under high temperature, along with the prevention of position gap of layer stack. Furthermore, thirdly, a highly safe non-aqueous secondary battery is needed that suppresses thermal runaway, ignition, and the like, and also a method for producing the non-aqueous secondary battery is needed.

Means for Solving the Problems

The present invention obtained a finding that, in a porous sheet provided with a porous base material including a polyolefin and a heat-resistant porous layer formed by a heat-resistant resin on one surface or both surfaces of the porous base material, thermal fusion allows for bonding of the porous sheet provided with the heat-resistant porous layer including the heat-resistant resin. The present invention has been accomplished based on the finding. Specifically, the present invention employs the following constitutions as specific means for achieving the above objects.

A first present invention is a connected porous sheet including one or a plurality of porous sheets, each having: a porous base material including a polyolefin; and a heat-resistant porous layer provided on one surface or both surfaces of the porous base material and including a heat-resistant resin, the connected porous sheet having at least one of a connecting region at which a part of the heat-resistant porous layer of the porous sheet has been connected to another part of the porous sheet by thermal fusion, or a connecting region at which a part of a heat-resistant porous layer of a first porous sheet selected from the plurality of porous sheets has been connected to a part of a second porous sheet different from the first porous sheet by thermal fusion.

A second present invention is a non-aqueous secondary battery separator including the connected porous sheet that is the first present invention.

A third present invention is a non-aqueous secondary battery including a plurality of battery units each including a positive electrode, a negative electrode, and the non-aqueous secondary battery separator that is the second present invention, a part of which separator is arranged between the positive electrode and the negative electrode; an outer packaging material enclosing the plurality of battery units in such a state that the battery units have been stacked on each other; and an electrolyte containing a lithium ion, the non-aqueous secondary battery obtaining electromotive force by doping and dedoping lithium.

A fourth present invention is method for producing a connected porous sheet by connecting one or a plurality of porous sheets, each having: a porous base material including a polyolefin; and a heat-resistant porous layer provided on one surface or both surfaces of the porous base material and including a heat-resistant resin, the method comprising: thermal fusing that connects a part of the heat-resistant porous layer of the porous sheet to another part of the porous sheet by thermal fusion, or that connects a part of a heat-resistant porous layer of a first porous sheet selected from the plurality of porous sheets to a part of a second porous sheet different from the first porous sheet by thermal fusion.

A fifth present invention is a method for producing a non-aqueous secondary battery including a positive electrode, a negative electrode, and a separator, the method comprising a thermal fusing in which a plurality of porous sheets, each having a porous base material including a polyolefin and a heat-resistant porous layer provided on one surface or both surfaces of the porous base material and including a heat-resistant resin, is used as the separator, and a part of a first porous sheet selected from the plurality of porous sheets is connected to a part of a second porous sheet different from the first porous sheet by thermal fusion, the thermal fusion is performed, in thermal fusing, using an impulse thermal fusion method by heating from both outer surface sides of the plurality of porous sheets.

Effects of the Invention

According to the present invention, a connected porous sheet is provided that has high safety under high temperature and has a continuous production suitability in the production process for products, improving production efficiency, and also a method for producing the connected porous sheet is provided. In addition, according to the present invention, a non-aqueous secondary battery separator is provided that can be used for a layered-type battery formed by stacking a separator and electrodes on each other and ensures more safety under high temperature along with the prevention of position gap of layer stack. Furthermore, according to the present invention, a highly safe non-aqueous secondary battery that suppresses thermal runaway, ignition, and the like are provided.

BEST MODES FOR CARRYING OUT THE INVENTION

Figure 1:
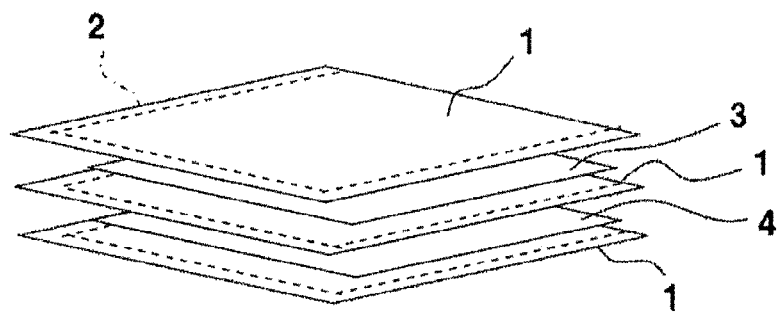
FIG. 1 is a schematic view depicting an example of a connected porous sheet of the present invention.

Embodiments of the present invention will be described in order below. Descriptions of the embodiments and Examples are intended to merely exemplify the present invention and should not be construed as limiting the scope of the invention.

<Connected Porous Sheet>

A connected porous sheet according to the present invention includes one or plural porous sheets each having a porous base material including a polyolefin and a heat-resistant porous layer provided on one surface or both surfaces of the porous base material and including a heat-resistant resin. In addition, the connected porous sheet of the present invention is formed by providing at least one of (1) a connecting region at which a part of the heat-resistant porous layer of the porous sheet is connected to another part of the porous sheet by thermal fusion and (2) a connecting region at which a part of a heat-resistant porous layer of a first porous sheet selected from plural porous sheets is connected to a part of a second porous sheet different from the first porous sheet by thermal fusion.

Such a connected porous sheet has high safety under high temperature. Additionally, in production of a product such as a battery separator, production in longer sizes than conventional ones and for example, adjustments for equalizing the lengths of electrodes and a separator forming a battery can be made, so that a continuous production suitability in the production process is obtainable. Therefore, production efficiency is improved.

When the connected porous sheet of the present invention is used for a layered-type battery having a layered structure formed by stacking respective pluralities of electrodes and separators on each other (hereinafter referred to also simply as "layered-type battery"), the connected porous sheet can be used to produce a non-aqueous secondary battery separator or the like ensuring higher safety against thermal runaway, ignition, and the like than conventional ones. In addition, as a use other than separator, the connected porous sheet of the present invention is usable for, for example, filter, semipermeable membrane, and the like. Furthermore, as another use, by utilizing heat resistant properties of the heat-resistant porous layer, mechanical strength of the porous base material including a polyolefin, and the like and also having thermal fusion suitability, the connected porous sheet of the present invention can be used for the production of products processed into an arbitrary shape.

The connected porous sheet of the present invention may be composed of a single porous sheet or composed of two or more porous sheets. When the connected porous sheet is composed of a single porous sheet, the porous sheet preferably has a portion to be fold. Preferably, the single porous sheet is folded at the portion to be folded, and then, mutually facing heat-resistant porous layers are thermal fused together to form the connecting region. In addition, when the connected porous sheet is composed of plural porous sheets, preferably, at least, a part of a first porous sheet selected from the plural porous sheets is thermal fused to a part of a second porous sheet arranged adjacent to the first porous sheet to form the connecting region. At the connecting region, the polyolefin porous base material and the component of the heat-resistant porous layer are present together. The connecting region integrates at least a part of the single porous sheet or the plural porous sheets.

Examples of when the connected porous sheet is composed of plural porous sheets include that plural porous sheets having the same rectangular shape are, as depicted in FIG. 1, layered together and the ends of three of four sides thereof or portions near the ends thereof all together are thermal fused to form a squared character-shaped connecting region 2 (a chain line portion). In the case of such a constitution, spaces between the respective porous sheets after thermal fusion become pockets, so that by alternately placing a positive electrode 3 and a negative electrode 4 in the spaces, a battery element for a layered-type battery can be formed.

Figure 2:
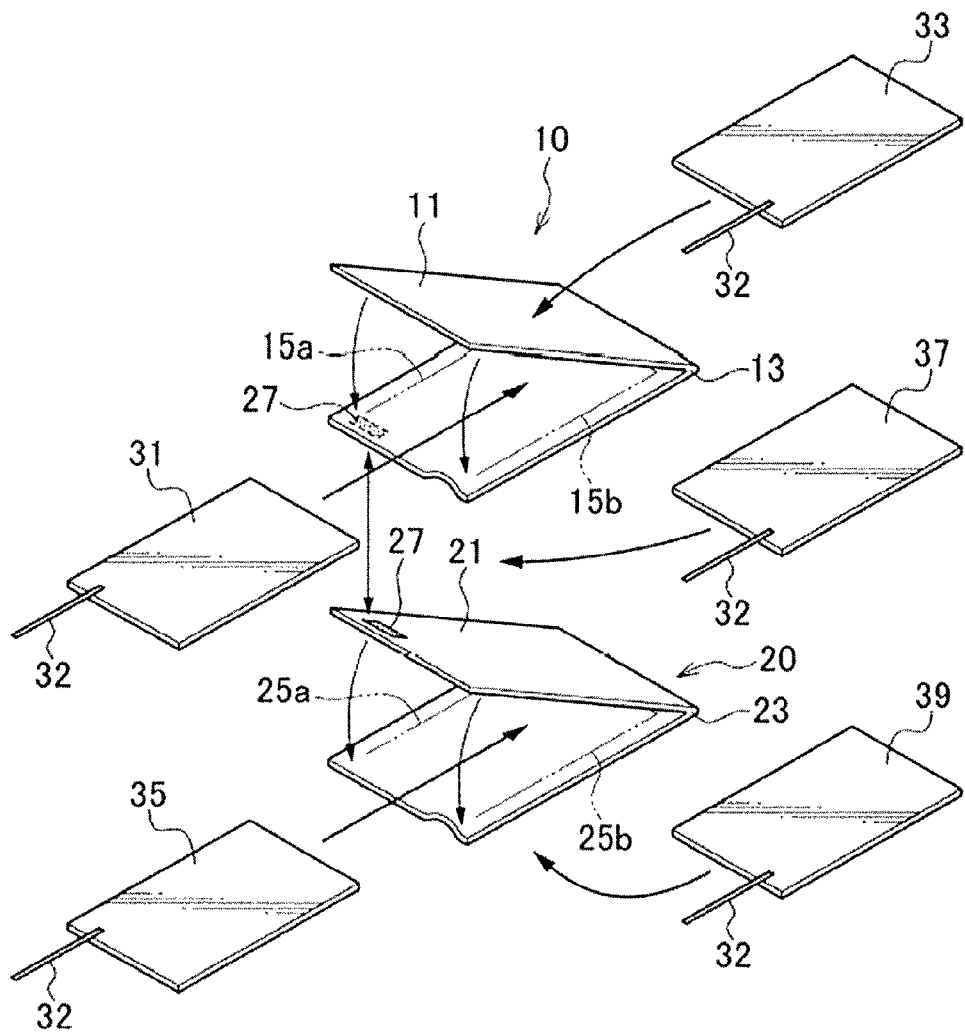
FIG. 2 is a schematic view depicting another example of the connected porous sheet of the present invention.
Figure 3:
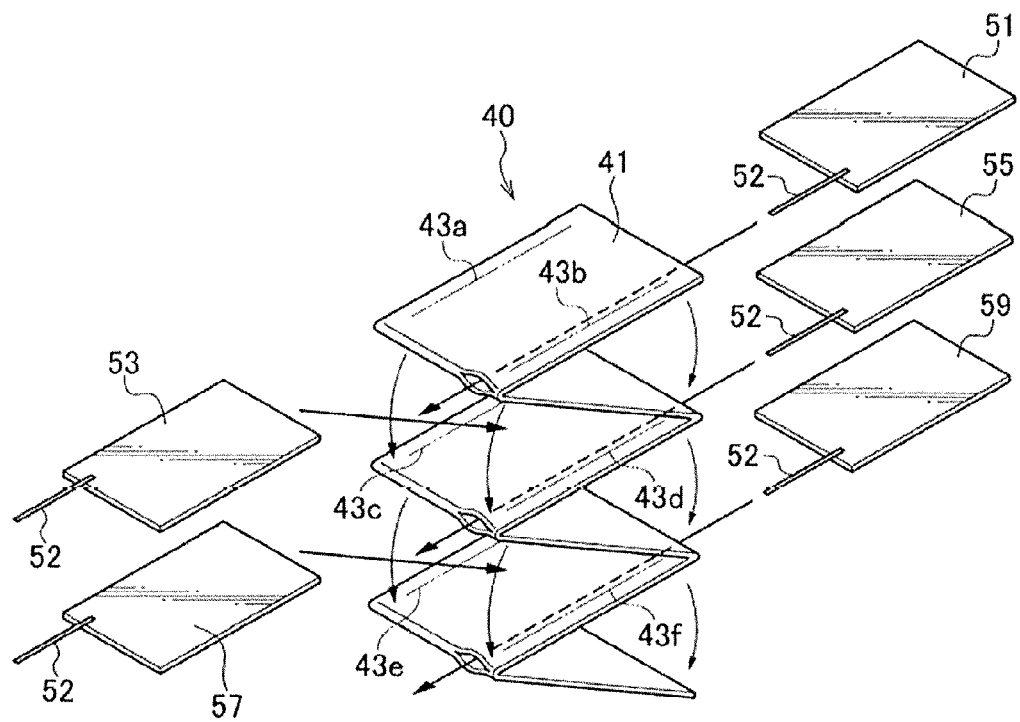
FIG. 3 is a schematic view depicting another example of the connected porous sheet according to the present invention.

In addition, examples of when the connected porous sheet is composed of a single porous sheet include that, in the viewpoint of producing a layered-type battery, a single porous sheet is provided with one or two or more portions to be folded, and the sheet is folded to thermally fuse mutually facing surfaces (for example, respective ends of the heat-resistant porous layer surface or respective regions near the ends thereof), so that the sheet is formed into a pouch shape. At this time, in the connected porous sheet, the mutually facing surfaces are connected by thermal fusion to form a connecting region(s). Examples of the folding manner in this case include a manner of folding rectangular porous sheets 11, 21 into half, as depicted in FIG. 2, and a manner of folding a long porous sheet 41 into a zigzag shape by repeating a mountain fold and a valley fold to form two or more folded portions, as depicted in FIG. 3. Then, the ends of each one side or two or more sides of two surfaces mutually facing in the folded state or regions near the ends thereof are heat sealed to each other.

In FIG. 2, an individual porous sheet 11, 21, an outermost layer on one surface or both surfaces of each of the sheets being a heat-resistant porous layer, is folded at a single portion to be folded 13, 23 so that the heat-resistant porous layer is inside. Next, the two mutually facing surfaces of the each sheet are folded to be thermal fused along longer sides of axial both ends. In this manner, near the ends of the respective longer sides are provided connecting regions 15a, 15b, 25a, 25b (two-dotted chain lines) to form pouch shapes. Then, connected porous sheets 10, 20 formed into the pouch shape in an embodiment may be connected to each other by a connecting region 27 formed at an opening end of the each pouch by thermal fusion, as depicted in FIG. 2.

To produce a non-aqueous secondary battery using the connected porous sheet 10, 20, as depicted in FIG. 2, electrode 31, 35 is inserted into the each pouch formed by the two surfaces mutually facing by folding each of the sheets so that the heat-resistant porous layer is inside and the connecting regions connecting the surfaces. Furthermore, an electrode 37 is inserted between the connected porous sheet 10 and the connected porous sheet 20 connected to each other. Still furthermore, although not shown in the drawing, electrodes 33 and 39, respectively, are inserted between the respective connected porous sheets 10 and 20 and other connected porous sheets are inserted. In this manner, a structure having three battery units can be formed by layering the positive and negative electrodes, and the non-aqueous secondary battery separators each partially arranged between the positive and negative electrodes.

Also, a lead wire 32 is connected to each of the electrodes 31, 33, 35, 37, and 39.

In addition, in FIG. 3, an individual porous sheet 41 having a heat-resistant layer on both surfaces thereof is folded at five portions to be folded and then, mutually facing two surfaces are thermal fused to each other along longer sides of axial both ends. Between the sheets layered by providing connecting regions 43a to 43f (two-dotted chain lines) near ends of respective longer sides are formed respective pouch shapes. At this time, the porous sheet 41 is in a folded state such that the heat-resistant porous layer is inside, and in regions where the sheets overlap each other, the heat-resistant porous layers are in a state of facing each other. In this manner, the connected porous sheet 40 is formed.

To produce a non-aqueous secondary battery using the connected porous sheet 41, as depicted in FIG. 3, electrodes 51, 53, 55, 57, and 59, respectively, are inserted into respective five pouches formed by the respective two surfaces mutually facing by folding the sheet so that the heat-resistant porous layer is inside and the connecting regions connecting the two surfaces. In this manner, a structure having five battery units can be formed by layering the positive electrodes, the negative electrodes, and the non-aqueous secondary battery separator partially arranged between the positive and negative electrodes. In addition to that, between both end surfaces of the connected porous sheet 41 and other connected porous sheets not shown in the drawing can be formed pouches by thermal fusion. An electrode is additionally inserted into each of these pouches and then the same operation is repeated according to need, whereby a structure layered battery units of 6 or more can be formed.

Also, a lead wire 52 is connected to each of the electrodes 51, 53, 55, 57, and 59. The lead wire connected to each of the electrodes 51, 55, and 59 is adapted to be led out through a hole formed in each portion to be folded of the connected porous sheet 41.

Figure 4:
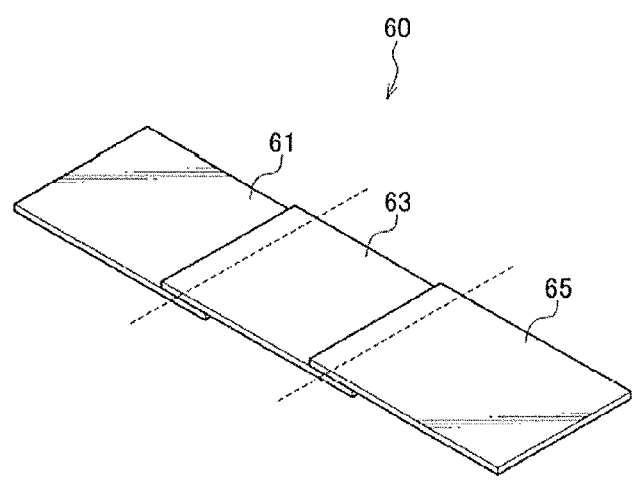
FIG. 4 is a schematic view depicting another example of the connected porous sheet according to the present invention.

In addition, as an example of when the connected porous sheet is composed of two or more porous sheets, the connected porous sheet may be a connected porous sheet 60 formed as depicted in FIG. 4. As the connected porous sheet in this case, for example, on one end of a first porous sheet 61 may be stacked one end of a second porous sheet 63 different therefrom, and on the other end of the second porous sheet 63 may be stacked one end of a third porous sheet 65 as a still another porous sheet to heat-seal the mutually overlapping two sheets at the ends thereof to like the sheets to each other.

At this time, in the porous sheet 61, 63, a heat-resistant porous layer may be provided as an outermost layer on one side of the porous base material. In this case, thermal fusion may be performed between a surface of the porous base material of the first porous sheet 61 and a surface of the heat-resistant porous film of the second porous sheet 63. In addition, for example, when the porous sheets 61 and 63 have the heat-resistant porous layer as the outermost layer on both sides of the porous base material, the heat-resistant porous layers are heat sealed to each other. Similarly, for example, when the porous sheets 63 and 65 both have the heat-resistant porous layer as the outermost layer on one side of the porous base material, a surface of the porous base material of the second porous sheet 63 may be heat sealed to a surface of the heat-resistant porous film of the third porous sheet 65. In addition, when the porous sheets 63 and 65 both have the heat-resistant porous layer as the outermost layer on both sides of the porous base material, the heat-resistant porous layers result in being heat sealed to each other.

When forming the connecting regions by thermal fusion as described above, the method for fusion is not particularly limited. As depicted in FIGS. 1 to 4, linear connecting regions may be formed along the length of the longer sides. The connecting regions may be formed into any shape, such as a dotted line, a broken line, a long broken line, a wavy line, or double lines, or a desired number of points (dots) may be formed in a desired or arbitrary position. In the formation of dots, the shape of dots, such as a circle, a square, a rectangle, a diamond, or oval, is not limited and an arbitrary size may be selected. For example, an embodiment of the connecting regions may be formed like a stamp.

Additionally, for example, when the porous sheet is a quadrilateral having four sides, a connecting region provided by thermal fusion may be formed on all the four sides, only one side, two sides, or three sides thereof.

[Porous Base Material]

The porous sheet forming the connected porous sheet of the present invention includes a porous base material including a polyolefin.

Examples of the porous base material include layers having porous structures of a microporous film form, a nonwoven fabric form, a paper form, and another three-dimensional network form. In terms of achieving better fusion, the porous base material is preferably a microporous film-form layer. As used herein, the microporous film-form layer (hereinafter referred to as also simply "microporous film") means a layer having a structure in which many pores are present thereinside and connected to each other to allow gas or liquid to pass from one face thereof to the other face thereof.

The porous base material used in the present invention may be any as long as polyolefin is included. From the viewpoint of thermal fusion, it is suitable to use a polyolefin having a melting point of 170° C. or less. Particularly, suitable examples of the polyolefin include polyolefins such as polyethylene, polypropylene, polymethylpentene, and copolymers thereof. Among them, preferable is polyethylene, and more preferable are high density polyethylene, a mixture of high density polyethylene and ultra high molecular weight polyethylene from the viewpoint of strength, heat resistance, and the like. In the present invention, a content of polyolefin in the porous base material is preferably 90% by mass or more with respect to a total mass of the material. Any other component that does not affect battery characteristics may be included if a content of the any other component is in a range of less than 10% by mass.

In the present invention, in terms of that excellent thermal fusion and strength of the base material can be obtained, the polyolefin forming the porous base material preferably includes a polyethylene having a molecular weight of from 200,000 to 2,000,000. From the viewpoint of thermal fusion, the molecular weight of the polyethylene is more preferably in a range of from 300,000 to 1,000,000. In addition, a polyethylene content in the porous base material is preferably 10% by mass or more. Molecular weight, as used herein, denotes not an average value of weight average molecular weights or the like but a value obtained by the following method. In addition, the polyethylene content means a proportion (% by mass) of a polyethylene having a molecular weight of from 200,000 to 2,000,000 in the polyolefin forming the porous base material. When the molecular weight of the polyolefin is 200,000 or more, mechanical strength of the porous base material improves, and when the molecular weight thereof is 2,000,000 or less, favorable thermal fusion is easily obtainable.

~Measurement of Content of Polyethylene Having Molecular Weight of from 200,000 to 2,000,000~

The polyethylene content (% by mass) is measured using gel permeation chromatography (GPC) by the following method. Specifically, to 15 mg of a sample is added 20 ml of a mobile phase for GPC measurement so as to completely dissolve the sample at 145° C. Then, the resulting solution is filtrated with a stainless steel sintered filter (pore size: 1.0 μm). Next, 400 μl of the filtrate is poured into the device to be subjected to measurement, and then a GPC curve is obtained under the following conditions. A value S1 is obtained by integrating the GPC curve over an interval of a molecular weight of from $2.0\times10^5$ to $2.0\times10^6$ and a value S2 is obtained by integrating the GPC curve over an interval of a molecular weight of from 0 to $4.0\times10^7$. Then, the value 51 is divided by the value S2 and raised to the 100th power to obtain the polyethylene content.

In the present invention, the thickness of the porous base material is preferably 5 μm or more from the viewpoint of mechanical strength and handling ability. The porosity of the porous base material is preferably from 30 to 60% from the viewpoint of permeability and mechanical strength. The Gurley value (JIS P8117) of the porous base material is preferably from 50 to 500 sec/100 cc from the viewpoint of mechanical strength and membrane resistance. The membrane resistance of the porous base material is preferably from 0.5 to 5 ohm-$cm^2$, considering influence on battery load characteristics when used as a battery separator. The penetration strength of the porous base material is preferably 250 g or more from the viewpoint of the short-circuit effect of battery when used as a battery separator or of processability. The tensile strength of the porous base material is preferably 10 N or more from the viewpoint of processability when used as a battery separator. The heat shrinkage ratio of the porous base material at 105° C. is preferably 5 to 30% from the viewpoint of obtaining good thermal fusion.

(Method for Producing Porous Base Material)

Following hereinbelow is a description of a preferable method for producing a porous base material used in the present invention.

Although the method for producing the porous base material of the present invention is particularly limited, the porous base material can be produced, specifically, for example by a method including the following steps from (1) to (6).

(1) Preparation of Polyolefin Solution

Polyolefin is dissolved in a solvent, such as paraffin, liquid paraffin, paraffin oil, mineral oil, castor oil, tetralin, ethylene glycol, glycerin, decalin, toluene, xylene, diethyl triamine, ethyl diamine, dimethyl sulfoxide, hexane, or a mixed solvent thereof to prepare a solution. The polyolefin solution has preferably a concentration of from 1 to 35% by mass.

(2) Extrusion of Polyolefin Solution

The prepared solution is kneaded in a single screw extruder or a twin screw extruder and extruded from a T-die or an I-die at a temperature of a melting point or higher and the melting point plus 60° C. or lower. Preferably, a twin screw extruder is used. Then, the extruded solution is allowed to pass over a chill roll or pass through a cooling bath to form a gel composition. In this case, preferably, the solution is rapidly cooled down to a gelation temperature or lower for gelation.

(3) Drying of Gel Composition

In a case of using a solvent that volatizes at a stretching temperature, the gel composition is dried.

(4) Stretching of Gel Composition

The gel composition is stretched. Here, before stretching treatment, relaxation treatment may be done. In the stretching treatment, the gel composition is heated and biaxially stretched with a predetermined factor by an ordinary tenter method, roll method, compressing method, or a combination of these methods. Biaxial stretching may be performed either simultaneously or sequentially. Additionally, biaxial stretching may be longitudinal multi-step stretching or three or four-step stretching.

When stretching, heating temperature is preferably 90° C. or higher and less than a melting point of polyolefin to be used in film formation, and more preferably from 100 to 120° C. In addition, although stretching ratio varies depending on the thickness of the original fabric, the stretching ratio is at least two times or more in the uniaxially-direction, and preferably from four to twenty times. After stretching, thermal immobilization may be performed according to need to provide dimensional stability against heating.

(5) Extraction and Removal of Solvent

The gel composition after having been stretched is immersed in an extraction solvent to extract solvent. As the extraction solvent, an easily volatile compound can be used. Examples of the easily volatile compound include hydrocarbons such as pentane, hexane, heptane, cyclohexane, decalin, and tetralin, chlorinated hydrocarbons such as methylene chloride, carbon tetrachloride, and methylene chloride, a fluorinated hydrocarbon such as ethane trifluoride, ethers such as diethyl ether and dioxane, and the like. These solvents can be arbitrarily selected according to a solvent used for dissolving polyolefin composition and may be used alone or in combination. In the solvent extraction, the solvent in the porous base material is removed to less than 1% by mass.

(6) Annealing of the Porous Base Material

The porous base material is heat set by annealing. The annealing is performed at from 80 to 150° C. The polyolefin microporous membrane may be produced by dry method without solvent, except for wet method above. In addition, the porous base material such as nonwoven fabric, paper, or the like by papermaking of fibrous material containing polyolefin

[Heat-Resistant Porous Layer]

The porous sheet forming the connected porous sheet of the present invention includes at least one heat-resistant porous layer on one surface or both surfaces of the above-described porous base material. Herein, the term "heat-resistant" means a characteristic that does not cause melting, decomposition, or the like in a temperature range of less than 200° C.

Examples of the heat-resistant porous layer include layers having porous structure such as microporous membrane-shaped, nonwoven fabric-shaped, paper-shaped or other three-dimensional network-shaped structure. As the heat-resistant porous layer, from the viewpoint of obtaining more excellent heat resistance, microporous membrane-shaped layer is preferred. The term "microporous membrane-shaped layer" means a layer which has a large number of micropores inside and has a structure in which these micropores are connected to each other, wherein gases or liquids can pass from one side of the layer to the other side of the layer.

In the present invention, the heat-resistant porous layer only needs to be formed on both surfaces or one surface of the porous base material. From the viewpoint of handling ability, endurance, and the effect of heat shrinkage suppression, the heat-resistant porous layer is preferably formed on both front and back surfaces of the porous base material. Additionally, the heat-resistant porous layer may be formed on a partial surface of the porous base material or may be formed in such a manner as to cover the entire surface of the porous base material, but preferably, the entire surface thereof is covered with the heat-resistant porous layer. In addition, when the heat-resistant porous layer has been formed only on one surface of the porous base material, separator deformation easily occurs in a heat compression bonding process, so that as compared to a porous base material having heat-resistant porous layers on both surfaces thereof, the appearance of a thermally compressed portion tends to be poorer. From such a viewpoint, the heat-resistant porous layer is preferably formed on both surfaces of the porous base material.

When the heat-resistant porous layer is formed on both surfaces of the porous base material, the heat-resistant porous layer has preferably a total thickness of from 3 to 12 µm. Meanwhile, when the heat-resistant porous layer is formed only on one surface of the porous base material, the heat-resistant porous layer has preferably a thickness of from 3 to 12 µm.

The heat-resistant porous layer has suitably a porosity ranging from 40 to 90%. Considering the above-described mechanism of thermal fusion in the present invention, the heat-resistant porous layer having such an appropriate porosity allows the thermal fusion to be favorably performed. More preferably, the porosity of the heat-resistant porous layer is suitably from 40 to 70% When the porosity thereof is 40% or more, the porous base material enters the heat-resistant porous layer to easily ensure high adhesion. In addition, the heat-resistant porous layer mechanically secures the structure in thermal fusion. Accordingly, due to the porosity thereof of 90% or less, the mechanical strength is maintained, which can prevent defects such as breakage in heat compression bonding.

In the connected porous sheet of the present invention, a balance between a pore volume of the heat-resistant porous layer and a volume of the porous base material is also important in terms of ensuring adhesion by thermal fusion. Specifically, when the porosity (%) and the thickness (µm), respectively, of the heat-resistant porous layer are $\epsilon_a$ and $t_a$, respectively, and a porosity (%) and a thickness (µm), respectively, of the porous base material are εb and tb, respectively, the following formula (1) is preferably satisfied:

$$(\epsilon a/100) \times ta \leq [1-(\epsilon b/100)] \times tb \qquad \text{Formula (1)}$$

Herein, the left side of Formula (1) represents an indication of the pore volume of the heat-resistant porous layer and the right side thereof represents an indication of the volume of the porous base material. That is, to ensure sufficient thermal fusion strength, preferably, the volume of the porous base material is larger than the pore volume of the heat-resistant porous layer.

The heat-resistant porous layer in the present invention includes at least a heat-resistant resin, preferably further includes an inorganic filler, and still further may include other component(s) according to need.

(Heat-Resistant Resin)

An appropriate heat-resistant resin used in the heat-resistant porous layer is a polymer having a melting point of 200° C. or higher or a polymer having no melting point but having a decomposition temperature of 200° C. or higher. Preferable examples of such a heat-resistant resin include at least one resin selected from the group consisting of wholly aromatic polyamides, polyimides, polyamide-imides, polyethersulfones, polysulfones, polyketones, polyether ketones, polyether imides, celluloses, and polytetrafluoroethylenes. Particularly, from the viewpoint of endurance, wholly aromatic polyamides are suitable, and from the viewpoint of facilitating formation of a porous layer and having excellent oxidation-resistance and reducibility, polymeta-phenylene isophthalamide as a meta-type wholly aromatic polyamide is more suitable.

(Inorganic Filler)

In the present invention, the heat-resistant porous layer preferably includes an inorganic filler. Even when the heat-resistant porous layer includes an inorganic filler, thermal fusion can be achieved by adjusting a particle size and a content of the inorganic filler with a good balance.

The inorganic filler is not particularly limited and specific examples of suitable inorganic fillers include metal oxides such as alumina, titania, silica, and zirconia, metal carboxylates such as calcium carbonate, metal phosphates such as calcium phosphate, metal hydroxides such as aluminium hydroxide, magnesium hydroxide, a mixture thereof, and the like. Such inorganic fillers are preferably highly crystalline, from the viewpoint of the elution of impurities and endurance.

An average particle size of the inorganic filler is preferably in a range of from 0.1 to 2 μm, from the viewpoint of heat resistance, moldability, and thermal fusion. A content of the inorganic filler is preferably from 50 to 95% by mass with respect to a total mass of the heat-resistant porous layer, from the viewpoint of heat resistance, ion permeability, and thermal fusion.

When the heat-resistant porous layer is in a form of a microporous film, the inorganic filler in the heat-resistant porous layer is present in a state captured by the heat-resistant resin. When the heat-resistant porous layer is a nonwoven cloth, paper, or the like, the inorganic filler only needs to be present in the constituent fiber or only needs to be immobilized on a surface of the nonwoven cloth, paper, or the like by a binder such as resin.

(Method for Producing Heat-Resistant Porous Layer)

A method for layering the heat-resistant porous layer in the present invention is not particularly limited as long as the porous sheet having the above-described constitution can be produced. Specifically, for example, the heat-resistant porous layer can be produced by a method including the following process (1) to (5).

(1) Preparing of Slurry for Coating

A heat resistant resin is dissolved in a solvent to produce a slurry for coating. Although the solvent may be any solvent as long as the solvent dissolves the heat resistant resin and is not particularly restricted, specifically, polar solvents are preferred, and examples of the polar solvent include N-methylpyrrolidone, dimethylacetamide, dimethylformamide and dimethyl sulphoxide. In addition to these polar solvents, examples of the solvent also include a solvent which is a poor solvent to the heat resistant resin. By applying such a poor solvent, a micro phase separation structure is induced, which facilitates making a porous structure when the heat-resistant porous layer is formed. As the poor solvent, alcohols are suitable, and particularly polyhydric alcohols such as glycols are suitable.

The concentration of the heat resistant resin in the slurry for coating is preferably 4 to 9% by mass. As required, an inorganic filler is dispersed to form a slurry for coating.

(2) Coating of Slurry

A slurry is coated on at least one side of the polyolefin microporous membrane. When heat-resistant porous layers are formed on both sides of the polyolefin microporous membrane, from the viewpoint of reduction of processes, it is preferred that the heat-resistant porous layers are coated on both sides of the substrate at the same time. Examples of a method of coating the slurry for coating include a knife coater method, a gravure coater method, a screen printing method, Meyer bar method, a die coater method, a reverse roll coater method, an inkjet method, a spray method, and a roll coater method. Among these, from the viewpoint of forming the coating layer uniformly, the reverse roll coater method is suitable.

(3) Coagulation of Slurry

A base material coated with the slurry is treated with a coagulation liquid that can coagulate the heat-resistant resin, whereby the heat-resistant resin is coagulated to form a heat-resistant porous layer made of the heat-resistant resin or a heat-resistant porous layer in which an inorganic filler has been bound to the heat-resistant resin. Examples of a method for treating with a coagulation liquid include spraying of a coagulation liquid to a base material coated with coating slurry, immersion of the base material in a bath containing a coagulation liquid (a coagulation bath), and the like. The coagulation liquid is not particularly limited as long as the liquid can coagulate the heat-resistant resin. Preferred is water or a liquid of an appropriate amount of water mixed in a solvent used for slurry. Herein, the amount of water to be mixed is suitably from 40 to 80% by mass with respect to the coagulation liquid.

(4) Removal of Coagulation Liquid

Coagulation liquid is removed by washing with water.

(5) Drying

The sheet is dried to remove water. Drying method is not particularly limited. Drying temperature is suitably from 50 to 80° C. When a high drying temperature is used, drying is performed preferably by contacting the sheet with a roll to prevent dimensional changes due to thermal shrinkage.

In addition, other than the wet coagulation method as described above, without coagulation after the coating of slurry, a drying method may be performed to remove a solvent by drying so as to form the heat-resistant porous layer. Alternatively, a fiber sheet including a heat-resistant resin may be made to separately form a heat-resistant porous sheet such as nonwoven cloth or paper and then, the sheet may be fused or adhered to the polyolefin porous base material.

<Method for Producing Connected Porous Sheet>

The method for producing a connected porous sheet according to the present invention is a method for producing the connected porous sheet of the present invention described above. Specifically, the method for producing connected porous sheet of the present invention is a method for producing a connected porous sheet by connecting one or plural porous sheets having a porous base material including a polyolefin and a heat-resistant porous layer provide on one surface or both surfaces of the porous base material and including a heat-resistant resin. The method is constructed by including thermal fusing that connects a part of the heat-resistant porous layer of the porous sheet to another part of the porous sheet by thermal fusion, or that connects a part of a heat-resistant porous layer of a first porous sheet selected from the plural porous sheets to a part of a second porous sheet different from the first porous sheet by thermal fusion.

In the method for producing the connected porous sheet of the present invention, thermal fusion allows the connecting between the porous base material and the heat-resistant porous layer and/or the connecting between the heat-resistant porous layers. As a result, in the production of a product such as separator for a battery, production in longer sizes than conventional products and, for example, adjustments such as uniforming the length of electrodes and a separator forming a battery can be made, whereby continuous production suitability in the production process can be obtained, improving production efficiency. Additionally, connecting by thermal fusion allows the produced connected porous sheet to have high safety under high temperature conditions.

Thermal fusion in the thermal fusing process can be performed by heat compressing at a desired temperature and with a desired pressure. The thermal fusion can be made by any method as long as the porous base material and the heat-resistant porous layer can be thermal fused to each other. Specifically, thermal fusion can be done by a method such as pressing (such as stamping) a heated portion having a desired shape selected according to the shape, area, or the like of a portion to be thermal fused or pressing a heated tip to move in such a way as to draw a line. Specific examples of a thermal fusion method include methods using a thermal fusion apparatus such as a hot plate press-type method and an impulse-type method. Among them, the impulse thermal fusion method is preferable in terms of that high bonding strength can be obtained by fusion.

The impulse-type method is a method that performs heat compression bonding as described below. Specifically, an electrically heated wire (a heater wire) is disposed at a portion where an object to be fused is to be subjected to heat compression bonding, and in a state in which the object to be fused is under pressure, a large current is momentarily allowed to flow through the electrically heated wire to cause the wire to produce heat, thereby heating and fusing the object. Then, the object is cooled down in the pressurized state, resulting in heat compression bonding. An impulse-type thermal fusion apparatus is characterized by that control of heating by electric current allows rapid heating and also rapid cooling after heating.

The impulse-type thermal fusion apparatus is preferably an apparatus capable of controlling temperature by the control of only thermal fusion time. Furthermore, since temperature and time both are important factors for thermal fusion, the apparatus is more preferably one capable of independently controlling both thermal fusion time and thermal fusion temperature.

When thermal fusing a porous sheet of the type in which a heat-resistant porous layer has been provided on the surface of a porous base material, the base material such as polyolefin is molten due to heat and the molten polyolefin or the like infiltrates into the heat-resistant porous layer. Thermal fusion seems to be achieved in a mechanism in which the infiltration causes porous sheets to be adhered to each other. Therefore, the thermal fusion between the porous sheets of the above type requires harder conditions as compared to conditions for performing thermal fusion between porous base materials such as polyolefin microporous films. Accordingly, in a state of being subjected to thermal fusion, the porous sheets often do not maintain sufficient mechanical strength. Depending on the thermal fusion method, a tear or the like easily occurs, for example when detaching a porous sheet from a stage for thermal fusion. Thus, there is a problem of the difficulty of handling.

In the impulse-type thermal fusion apparatus as described above, the application of electric current allows immediate heating for conditions enabling thermal fusion, and after the thermal fusion, immediate cooling is done. Therefore, when detaching of a porous sheet from the surface of a stage for thermal fusion, sufficient mechanical strength can be ensured, which is thus advantageous in terms of handling. Particularly, in a porous sheet of the type in which the heat-resistant porous layer has been provided on the surface of the porous base material as described above, the use of the impulse-type thermal fusion apparatus is advantageous in that thermal fusion can be further facilitated and high adhesion strength is easily ensured.

In addition, thermal fusion may be performed in such a manner that the porous sheet as a material to be fused is heated from one outer surface side to be heat sealed. Alternatively, thermal fusion may be performed in such a manner that materials to be fused are heated from both outer surface sides thereof, that is, for example as depicted in FIG. 1, from both surfaces of two separators 1 forming the outermost layers, so as to be thermal fused. In terms of ensuring adhesion strength, a preferable embodiment is to heat the materials to be fused from both outer surface sides thereof. Particularly, preferably, using the impulse thermal fusion method, the porous sheets as the materials to be fused are thermal fused from both outer surface sides thereof.

In addition, in the present invention, when thermal fusing the polyolefin porous base material to the porous sheet having the heat-resistant porous layer, the base material and the sheet need to be thermal fused with the heat-resistant porous layer therebetween. In other words, in either case of single porous sheet or plural porous sheets, thermal fusion needs to be performed by stacking the sheets in such a manner that a heat-resistant porous layer has been abutted with an other heat-resistant porous layer or the heat-resistant porous layer has been abutted with an other polyolefin porous base material. It has conventionally been thought that the presence of the heat-resistant porous layer makes thermal fusion itself difficult to perform. In contrast, the present invention has a technical significance in that, the mechanism has been found in which polyolefin in the heat-resistant base material is molten and infiltrated into the heat-resistant porous layer to allow the bonding between porous sheets. Meanwhile, the case of using the impulse-type thermal fusion apparatus is not limited thereto, and thermal fusion may be performed between a polyolefin porous base material and an other polyolefin porous base material.

Conditions for thermal fusion are not particularly limited as long as the conditions are in a range allowing the formation of a state in which porous sheets have been fused and connected to each other, and the conditions therefor can be arbitrarily selected according to the material of the porous sheet or the like.

Above all, as preferable conditions for thermal fusion, suitable are a thermal fusion temperature of from 150 to 220° C., a thermal fusion pressure of 0.01 MPa or more, and a thermal fusion time of 0.1 seconds or more.

When the thermal fusion temperature is in the range of from 150 to 220° C., in a case of using the connected porous sheet for a non-aqueous secondary battery separator, thermal fusion is favorably performed, so that good shutdown characteristics and heat resistance can be maintained. Fusion temperature depends on the fluidity of polyolefin and the structure of the heat-resistant porous layer. The fusion temperature of 150° C. or higher means that polyolefin hardly flows out, which is preferable in terms of that heat resistance can be favorably maintained. In addition, the fusion temperature of 220° C. or lower means that the fluidity of polyolefin is maintained. The above range is preferable in terms of having good shutdown characteristics and avoiding the risk of breakage of the non-aqueous secondary battery due to heat. Additionally, the thermal fusion temperature is more preferably in a range of from 160 to 200° C.

Compression bonding in fusion is generally performed with a compression bonding strength of 0.01 MPa or more, which is suitable to favorably perform thermal fusion between porous sheets. The compression bonding in fusion is more preferably 0.05 MPa or more. An upper limit of the compression bonding is desirably 10 Mpa.

The fusion time is preferably 0.1 seconds or more, and under such a condition, thermal fusion between porous sheets can be more favorably performed. The thermal fusion time is more preferably 1 seconds or more. An upper limit of the fusion time is desirably 360 seconds.

When performing thermal fusion using the impulse-type method, in the thermal fusion conditions mentioned above, preferable are a thermal fusion temperature of from 190 to 220° C., a thermal fusion pressure of from 0.1 to 5 MPa or more, and a thermal fusion time of from 1 to 15 seconds or more.

Specifically, the thermal fusion temperature in thermal fusion is suitably in the range of from 190 to 220° C. When the thermal fusion temperature is 190° C. or higher, the bonding strength between the porous sheets is further ensured. Additionally, the thermal fusion temperature is 220° C. or lower, oxidative deterioration of the porous sheets can be prevented, which is advantageous for avoiding yellowing.

When thermal fusion is performed by the impulse-type method, the thermal fusion time is suitably in the range of from 1 to 15 seconds. Considering that thermal fusion is performed in the mechanism as described above, for the thermal fusion between porous sheets, sufficient time is necessary to allow the porous base material such as polyolefin to be molten and then infiltrated into the heat-resistant porous layer. From such a viewpoint, when the thermal fusion time is 1 seconds or more, adhesion strength between the porous sheets is ensured. Additionally, when the thermal fusion time is 15 seconds or less, deterioration of the porous base material is suppressed and thus high productivity is maintained.

In addition, when thermal fusion is performed by the impulse-type method, the thermal fusion pressure is suitably in the range of from 0.1 to 5 MPa. Considering the mechanism in which the molten porous base material infiltrates into the heat-resistant porous layer to allow the bonding between the porous sheets as described above, as the pressure is higher, the molten porous base material more easily enters the heat-resistant porous layer. Thus, the pressure is an important factor. From the viewpoint, setting the thermal fusion pressure to 0.1 MPa or more facilitates the infiltration of the porous base material into the heat-resistant porous layer, thereby ensuring higher adhesion strength. In addition, setting the thermal fusion pressure to 5 MPa or less serves to maintain mechanical properties in the heat compression bonding of porous sheets, which is advantageous for preventing the occurrence of breakage or the like.

<Non-Aqueous Secondary Battery Separator>

A non-aqueous secondary battery separator according to the present invention is formed using the connected porous sheet described above. With the non-aqueous secondary battery separator provided with the connected porous sheet of the present invention, shutdown characteristics can be obtained by the polyolefin-containing porous base material used as a base material. In addition, even when polyolefin has been molten under a temperature reaching a shutdown temperature or higher, the heat-resistant porous layer allows the molten polyolefin to be retained in a state of adhering on the heat-resistant porous layer, thereby preventing meltdown. As a result, safety under high temperature can be ensured. Additionally, in the present invention, with the formation of a connecting region(s) on the non-aqueous secondary battery separator by thermal fusion, position gap between electrodes and the separator layered on each other in the layered structure can be prevented and thus short circuit between the electrodes due to the position gap can be avoided, whereby safety can be further ensured. Therefore, the non-aqueous secondary battery separator of the present invention allows the provision of a non-aqueous secondary battery having higher safety than conventional ones.

The non-aqueous secondary battery separator of the present invention has preferably an entire film thickness of 30 μm or less. When the separator is 30 μm or less in thickness, energy density of a non-aqueous secondary battery that has been produced can be favorably maintained.

The porosity of the non-aqueous secondary battery separator of the present invention is preferably from 30 to 70% from the viewpoint of permeability and mechanical strength.

The Gurley value (JIS P8117) of the non-aqueous secondary battery separator of the present invention is preferably from 100 to 500 sec/100 cc from the viewpoint of mechanical strength and membrane resistance.

The membrane resistance value of the non-aqueous secondary battery separator of the present invention is preferably from 1.5 to 10 ohm-cm$^2$, from the viewpoint of the load characteristics of non-aqueous secondary battery The penetration strength of the non-aqueous secondary battery separator of the present invention is preferably 250 g or more from the viewpoint of the short circuit resistance.

The tensile strength of the non-aqueous secondary battery separator of the present invention is preferably 10 N or more from the viewpoint of production made of battery.

The shutdown temperature of the non-aqueous secondary battery separator of the present invention is preferably from 130 to 155° C. from the viewpoint of safety of battery under high temperature. As used herein, the shutdown temperature represents a temperature at a resistance value of 10$^3$ ohm-cm$^2$. When the shutdown temperature is 130° C. or higher, simultaneously the polyolefin microporous film is hardly completely molten, a phenomenon called meltdown causing a short circuit phenomenon hardly occurs at low temperature. Accordingly, the above shutdown temperature is preferable in terms of safety. In addition, when the shutdown temperature is 155° C. or lower, safeguard under high temperature conditions can be expected. Preferable is from 135 to 150° C.

The heat shrinkage ratio of the non-aqueous secondary battery separator of the present invention at 105° C. is preferably 0.5 to 10% from the viewpoint of shape stability and shutdown characteristics.

<Non-Aqueous Secondary Battery>

A non-aqueous secondary battery according to the present invention is a non-aqueous secondary battery obtaining electromotive force by doping and dedoping lithium and is formed by including the non-aqueous secondary battery separator of the present invention having the above-described structure. The non-aqueous secondary battery is configured in such a manner that an electrolyte has been impregnated into a battery element having a negative electrode and a positive electrode opposed to each other with the separator therebetween and the resulting structure has been enclosed by an outer packaging material.

Specifically, the non-aqueous secondary battery of the present invention is formed by providing plural battery units each of which including a positive electrode, a negative electrode, and the non-aqueous secondary battery separator of the present invention described above, a part of which separator being arranged between the positive electrode and the negative electrode, an outer packaging material enclosing the plural battery units in a laminated state, and a lithium ion-containing electrolyte. The non-aqueous secondary battery of the present invention is adapted to obtain electromotive force by doping and dedoping lithium.

In the present invention, the non-aqueous secondary battery includes, as a separator, the non-aqueous secondary battery separator including the connected porous sheet of the present invention described above, so that position gap of the electrodes and the separator in the layered section can be prevented, thereby reducing the occurrence of thermal runaway, ignition, or the like. Therefore, the non-aqueous secondary battery separator of the present invention has higher safety than conventional ones.

The battery unit included in the non-aqueous secondary battery of the present invention has preferably, as a single structural unit, a layered structure formed by stacking the positive electrode, the negative electrode, and the separator in an order of positive electrode/separator/negative electrode/separator or, as a single structural unit, a layered structure formed by stacking the above components in an order of separator/positive electrode/separator/negative electrode. Preferably, the battery unit in the present invention is formed by stacking one or more units of the layered structures to thereby allow the battery unit to have a layered-type structure in which the positive electrode or the negative electrode has been immobilized by the separators. Such a non-aqueous secondary battery has high safety under high temperature conditions, since the battery has been formed into the layered type including the non-aqueous secondary battery separator of the present invention. Furthermore, in the non-aqueous secondary battery, when formed into the layered structure, gap of layered positions of the layered materials, specifically, the electrodes and the separators can be prevented, thereby preventing short circuit due to the position gap.

(Negative Electrode)

The negative electrode has a structure in which a negative electrode mixture composed of a negative-electrode active material, an auxiliary conductive agent and a binder is formed on a collecting body. Examples of the negative-electrode active material include a material on which lithium can be electrochemically doped, such as carbon materials, silicon, aluminium, tin or Wood's metal. Examples of auxiliary conductive agent include carbon materials such as acetylene black and Ketjenblack. The binder is composed of an organic polymer such as polyvinylidene fluoride or carboxymethylcellulose. Examples of the collecting body can include copper foil, stainless foil and nickel foil.

(Positive Electrode)

The positive electrode has a structure in which a positive electrode mix composed of a positive-electrode active material, an auxiliary conductive agent and a binder is formed on a collecting body. Examples of the positive electrode active substance include lithium-containing transition metal oxides, such as $LiCoO_2$, $LiNiO_2$, $LiMn_{0.5}Ni_{0.5}O_2$, $LiCo_{1/3}Ni_{1/3}Mn_{1/3}O_2$, $LiMn_2O_4$, $LiFePO_4$, and the like. Examples of auxiliary conductive agent include carbon materials such as acetylene black and Ketjenblack. The binder is composed of an organic polymer such as polyvinylidene fluoride. Examples of the collecting body can include aluminum foil, stainless foil and titanium foil.

(Electrolyte)

The electrolyte has a constitution in which a lithium salt is dissolved in a non-aqueous solvent. Examples of the lithium salt include $LiPF_6$, $LiBF_4$ and $LiClO_4$. Examples of the non-aqueous solvent include propylenecarbonate, ethylene carbonate, dimethylcarbonate, diethylcarbonate, ethylmethylcarbonate, γ-butyrolactone and vinylene carbonate. These may be used alone or mixed to be used.

(Outer Packaging Material)

The non-aqueous secondary battery of the present invention is enclosed in such a manner that the battery units have been laminated and packed, using an outer packaging material such as a film. Examples of the outer packaging material include aluminium laminate packaging material, and the like. The thickness of the outer packaging material is not particularly limited and can be arbitrarily selected.

Examples of the shape of the non-aqueous secondary battery include a rectangular shape, a cylindrical shape, a coin shape, and the like. The non-aqueous secondary battery separator of the present invention described above can be applied suitably to any shape and thus can be molded into a desired shape according to the purpose or the like. Above all, to adopt the battery for use in hybrid cars, it is preferable to use an aluminium laminate packaging as the outer packaging material and select a rectangular shape for the battery, in terms of facilitating an increase in size of the non-aqueous secondary battery and thereby achieving capacity enlargement relatively easily.

Figure 5:
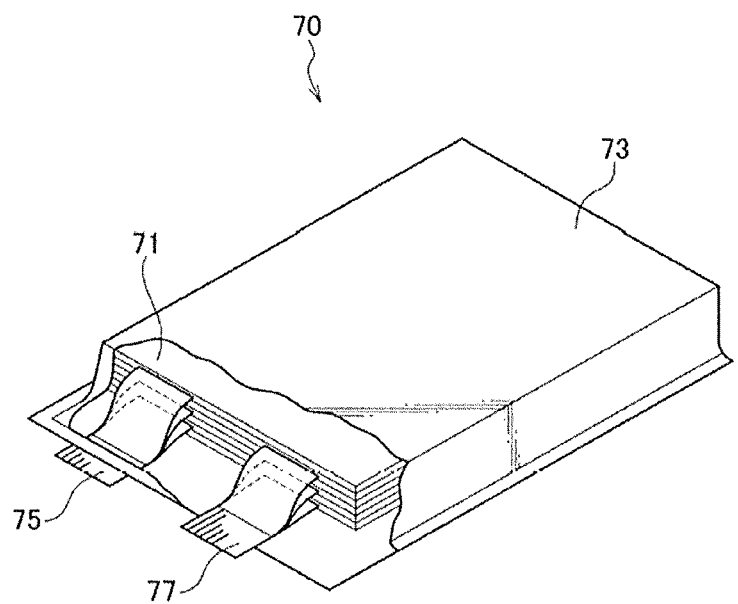
FIG. 5 is a schematic perspective view schematically depicting a structural example of a rectangular non-aqueous secondary battery formed by laminating and packing layered bodies each including a non-aqueous secondary battery separator of the present invention and electrodes.

Given hereinbelow is a description of an example of the non-aqueous secondary battery of the present invention, with reference to FIG. 5. FIG. 5 schematically depicts an example of a rectangular non-aqueous secondary battery in which a layered body including the non-aqueous secondary battery separators of the present invention and electrodes has been laminated and packed.

As depicted in FIG. 5, a non-aqueous secondary battery 70 has a layered structure in which a battery unit 71 formed by layering respective plural positive electrodes, negative electrodes, and separators, which are not shown in the drawing, has furthermore been layered in plural numbers. The layered body composed of the layered structure is enclosed by an aluminium laminate film 73 used as an outer packaging material. The layered body has an opening portion in a part thereof in the state of being enclosed by the aluminium laminate film 73. From the opening portion, a bundle of lead wires (lead tab) 75 connected to positive electrodes of the battery units and a bundle of lead wires (lead tab) 77 connected to negative electrodes thereof are drawn out to allow electric current to flow outside the battery. The electrodes and the separators are, as depicted in FIG. 1 and the like, molded into a rectangular shape. Thus, due to the structure enclosing the layered body formed by lamination of these components, the laminate-pack laminate battery depicted in FIG. 5 has a rectangular shape.

Figure 6:
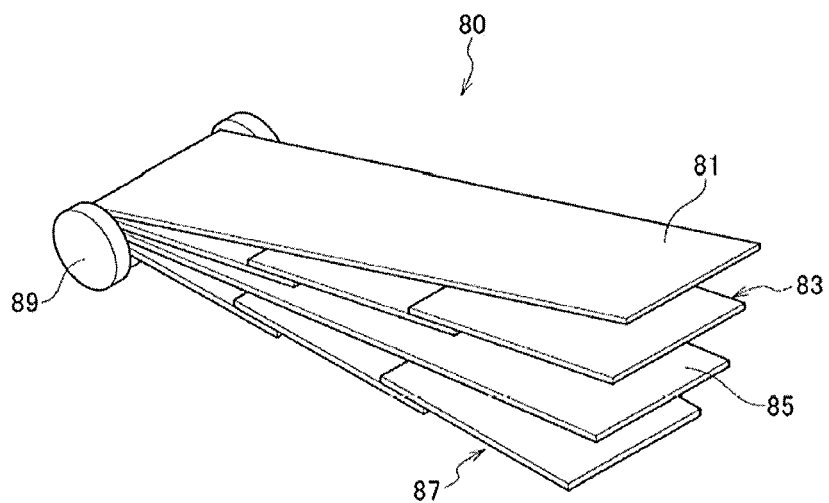
FIG. 6 is a schematic perspective view schematically depicting a structural example of a cylindrical battery formed by using elongated connected porous sheets each including plural porous sheets connected by thermal fusion.

In addition, another example of the non-aqueous secondary battery of the present invention will be described with reference to FIG. 6. FIG. 6 schematically depicts an example of a cylindrical battery using elongated connected porous sheets formed by connecting plural porous sheets by thermal fusion.

As depicted in FIG. 6, a non-aqueous secondary battery 80 has a cylindrical geometry formed by superimposing an positive electrode 81 and a negative electrode 85 as electrodes, an elongated connected porous sheet 83, a part of which is arranged between the positive electrode and the negative electrode and which includes plural porous sheets connected by thermal fusion mutually overlapping portions thereof as depicted in FIG. 4, and an elongated connected porous sheet 87 arranged on a side of the negative electrode 85 not facing the connected porous sheet 83 and having portions connected by thermal fusion, as in the connected porous sheet 83, in this order and then rolling up by a roll-up shaft 89. The non-aqueous secondary battery 80 is formed into a cylindrical shape by enclosing the formed cylindrical geometry using an aluminium laminate film, which is not shown in the drawing.

[Method for Producing Non-Aqueous Secondary Battery]

A method for producing a non-aqueous secondary battery according to the present invention can be any as long as the method utilizes the method for producing a connected porous sheet described above.

In the method for producing a non-aqueous secondary battery of the present invention, a connected porous sheet is produced by the method for producing a connected porous sheet of the present invention described above, namely, the method including the thermal fusing described above. As a result, continuous production suitability can be obtained and thereby production efficiency is improved, as well as a non-aqueous secondary battery having high safety under high temperature is provided.

Particularly, in the present invention, the following method is preferable. That is, a method for producing a non-aqueous secondary battery including a positive electrode, a negative electrode, and a separator uses, as the separator, plural porous sheets having a porous base material including a polyolefin and a heat-resistant porous layer provided on one surface or both surfaces of the porous base material and including a heat-resistant resin. The method includes thermal fusing that connects a part of a first porous sheet (separator) selected from plural porous sheets to a part of a second porous sheet (separator) different from the first porous sheet (separator) by thermal fusion. In the thermal fusing, using an impulse thermal fusion method, heat is applied from both outer surface sides of the plural sheets to perform thermal fusion.

According to the method as above, the impulse thermal fusion method can facilitate the immobilization of the electrodes and the separator.

Such a production method preferably includes cutting the positive electrode, the negative electrode, and the separator into a predetermined sheet shape and layering one or more structural units each including the positive electrode, the negative electrode, and the separator as a single structural unit has a layered structure of positive electrode/separator/negative electrode/separator or as a single structural unit has a layered structure of separator/positive electrode/separator/negative electrode. The thermal fusing preferably includes a step of heat-sealing mutually facing ends of the plural separators to connect the plural separators so as to immobilize the positive electrode, the negative electrode, and the separator.

Specifically, for example as depicted in FIG. 1, a positive electrode 3, a negative electrode 4, and a separator 1 are cut into a predetermined shape. In this case, considering the later thermal fusing, the separator 1 needs to be cut into a larger shape than the positive electrode 3 and the negative electrode 4. Then, the positive electrode 3, the negative electrode 4, and the separator 1 are stacked in an order of separator 1/positive electrode 3/separator 1/negative electrode 4/separator 1. At this point in time, the size of the separators 1 is larger than the electrodes 3 and 4, considering a portion to be subjected to heat compression bonding. Thus, outer peripheral edge portions of the separators are protruding more outward than outer peripheral edge portions of the electrodes. Then, respective three sides of the outer peripheral edge portions of the plural separators 1 are opposed to each other and ends of the three sides together are heat sealed by the above-described impulse thermal fusion method. In this manner, a separator composed of the connected porous sheet is formed, and at the same time, the electrodes can be immobilized in a pouch of the separator. Therefore, as compared to a case in which a pouch-shaped connected porous sheet is formed in advance by thermal fusion and then the electrodes are inserted therein, higher productivity can be ensured. The laminate of the electrodes and the separators formed as above is set alone or in a state of having been stacked in plural numbers to weld a positive tab and a negative tab. After that, the resulting product is placed in a battery outer package, an electrolyte is injected therein, and the outer package is enclosed, whereby a non-aqueous secondary battery can be produced. The described method is a preferable method from the viewpoint of productivity. The separator thermal fusion technique of the present invention is applicable not only to bonding of two separators but also to bonding plural separators, so that the technique of the present invention can minimize the number of times of thermal fusion. Thus, the invention is characterized also by further increasing productivity.

In the thermal fusing described above, from the viewpoint of obtaining favorable thermal fusion by the impulse method, thermal fusion is preferably performed under conditions of a thermal fusion temperature of from 190 to 220° C., a thermal fusion pressure of from 0.1 to 5 MPa, and a thermal fusion time of from 1 to 15 seconds.

In addition, the non-aqueous secondary battery of the present invention can also be produced as follows.

Specifically, the connected porous sheet of the present invention, a positive electrode plate and a negative electrode plate are prepared. A part of the connected porous sheet is sandwiched between the positive electrode and the negative electrode to stack the components in a laminated state of positive electrode/connected porous sheet/negative electrode. In this state, the resulting structure is passed through a laminator. The mutually facing sheets are heat sealed and immobilized in the laminator to produce a battery unit. Then, the obtained battery unit is piled up in plural numbers and the entire structure is wrapped with an outer packaging material as a film, whereby a secondary battery can be produced.

In addition, as another method, the non-aqueous secondary battery of the present invention may be produced as follows. As depicted in FIGS. 2 to 3, the porous sheets are heat sealed together in advance to produce a connected porous sheet having connecting regions. After that, in the produced connected porous sheet are arranged a positive electrode plate and a negative electrode to produce a battery unit having a layered structure of positive electrode/connected porous sheet/negative electrode. The obtained battery unit is piled up in plural numbers and the entire structure is wrapped with an outer packaging material as a film, whereby a secondary battery can be produced.

Described hereinbelow are preferable embodiments of the connected porous sheet of the present invention and the production method therefor, the non-aqueous secondary battery separator of the invention, as well as the non-aqueous secondary battery of the invention and the production method therefor.

<1> A connected porous sheet including one or a plurality of porous sheets, each having: a porous base material including a polyolefin; and a heat-resistant porous layer provided on one surface or both surfaces of the porous base material and including a heat-resistant resin, the connected porous sheet having at least one of a connecting region at which a part of the heat-resistant porous layer of the porous sheet has been connected to another part of the porous sheet by thermal fusion, or a connecting region at which a part of a heat-resistant porous layer of a first porous sheet selected from the plurality of porous sheets has been connected to a part of a second porous sheet different from the first porous sheet by thermal fusion.

<2> The connected porous sheet as described in the above <1>, in which the heat-resistant porous layer has a thickness of from 3 to 12 µm and a porosity of from 40 to 90%.

<3> The connected porous sheet as described in the above <1> or <2>, in which the polyolefin includes polyethylene having a molecular weight of from 200,000 to 2,000,000.

<4> The connected porous sheet as described in any one of the above <1> to <3>, in which when a porosity (%) and a thickness (µm) of the heat-resistant porous layer are $\epsilon a$ and ta, respectively, and a porosity and a thickness (µm) of the porous base material are $\epsilon b$ (%) and tb, respectively, the connected porous sheet satisfies the following formula (1):

$$(\epsilon a/100) \times ta \leq [1-(\epsilon b/100)] \times tb \quad \text{Formula (1)}<$$

<5> The connected porous sheet as described in any one of the above <1> to <4>, in which the heat-resistant resin is a polymer having a melting point of 200° C. or higher or a polymer having no melting point but having a decomposition temperature of 200° C. or higher.

<6> The connected porous sheet as described in any one of the above <1> to <5>, in which the heat-resistant porous layer is formed on both surfaces of the porous base material.

<7> A non-aqueous secondary battery separator including the connected porous sheet as described in any one of the above <1> to <6>.

<8> A non-aqueous secondary battery including a plurality of battery units each including a positive electrode, a negative electrode, and the non-aqueous secondary battery separator as described in the above <7>, a part of which separator is arranged between the positive electrode and the negative electrode; an outer packaging material enclosing the plurality of battery units in such a state that the battery units have been stacked on each other; and an electrolyte containing a lithium ion, the non-aqueous secondary battery obtaining electromotive force by doping and dedoping lithium.

<9> A method for producing a connected porous sheet by connecting one or a plurality of porous sheets, each having: a porous base material including a polyolefin; and a heat-resistant porous layer provided on one surface or both surfaces of the porous base material and including a heat-resistant resin, the method comprising: thermal fusing that connects a part of the heat-resistant porous layer of the porous sheet to another part of the porous sheet by thermal fusion, or that connects a part of a heat-resistant porous layer of a first porous sheet selected from the plurality of porous sheets to a part of a second porous sheet different from the first porous sheet by thermal fusion.

<10> The method for producing a connected porous sheet as described in the above <9>, in which, in the thermal fusing, the thermal fusion is performed using an impulse thermal fusion method by heating from both outer surface sides of the porous sheets.

<11> The method for producing a connected porous sheet as described in the above <9> or <10>, in which, in the thermal fusing, the thermal fusion is performed under conditions of a thermal fusion temperature of from 150 to 220° C., a thermal fusion pressure of 0.01 MPa or more, and a thermal fusion time of 0.1 seconds or more.

<12> The method for producing a connected porous sheet according to any one of claim 9 to claim 11, wherein, in the thermal fusing, the thermal fusion is performed using an impulse thermal fusion method under conditions of a thermal fusion temperature of from 190 to 220° C., a thermal fusion pressure of from 0.1 to 5 MPa, and a thermal fusion time of from 1 to 15 seconds.

<13> A method for producing a non-aqueous secondary battery including a positive electrode, a negative electrode, and a separator, the method comprising a thermal fusing in which a plurality of porous sheets, each having a porous base material including a polyolefin and a heat-resistant porous layer provided on one surface or both surfaces of the porous base material and including a heat-resistant resin, is used as the separator, and a part of a first porous sheet selected from the plurality of porous sheets is connected to a part of a second porous sheet different from the first porous sheet by thermal fusion, the thermal fusion is performed, in the thermal fusing, using an impulse thermal fusion method by heating from both outer surface sides of the plurality of porous sheets.

<14> The method for producing a non-aqueous secondary battery as described in the above <13>, further having cutting the positive electrode, the negative electrode, and the separator into a predetermined sheet shape; and stacking one or more structural units each including the positive electrode, the negative electrode, and the separator, in which a single structural unit has a layered structure of positive electrode/separator/negative electrode/separator or a layered structure of separator/positive electrode/separator/negative electrode, the thermal fusing including performing thermal fusion of mutually facing ends of the plurality of separators to connect the plurality of separators so as to immobilize the positive electrode, the negative electrode, and the separator.

<15> The method for producing a non-aqueous secondary battery as described in the above <13> or <14>, in which the thermal fusing comprises thermal fusion under conditions of a thermal fusion temperature of from 190 to 220° C., a thermal fusion pressure of from 0.1 to 5 MPa, and a thermal fusion time of from 1 to 15 seconds.

EXAMPLES

Hereinbelow, the present invention will be described in more detail with reference to Examples. It should be understood that the present invention is not limited thereto within the scope thereof. In addition, "parts" is based on mass, unless otherwise specified.

[Measurement and Evaluation (1)]

Regarding the following Examples 1 to 10 and Comparative Examples 1 to 2, measurements and evaluations were performed according to the following methods.

(1) Film Thickness

The thickness of a non-aqueous secondary battery separator (a total thickness of a polyolefin microporous film and a heat-resistant porous layer) and a thickness of the polyolefin microporous film were measured at 20 points by a contact film thickness gauge (manufactured by Mitutoyo Corporation) and the resulting measurements were averaged to obtain the sample thickness. Here, the measurement used a cylindrical contact probe having a bottom diameter of 0.5 cm.

(2) Unit Weight

Regarding unit weights of the non-aqueous secondary battery separator and the polyolefin microporous film, the sample is cut out into a size of 10 cm×10 cm to measure the weight of the piece. Then, the weight was divided by the area thereof to obtain a Unit weight, a weight per 1 m$^2$.

(3) Porosity

The porosities of the non-aqueous secondary battery separator and the polyolefin microporous film were obtained by the following formula:

$$\epsilon = \{1 - Ws/(ds \cdot t)\} \times 100$$

In the formula, $\epsilon$ represents porosity (%), Ws represents Unit weight (g/m$^2$), ds represents true density (g/cm$^3$), and t represents film thickness (μm).

(4) Gurley Value

The gurley values of the non-aqueous secondary battery separator and the polyolefin microporous film were obtained according to JIS P8117.

(5) Membrane Resistance

The membrane resistances of the non-aqueous secondary battery separator and the polyolefin microporous film were obtained by the following method.

The sample is cut out into a size of 2.6 cm×2.0 cm. The cut out sample is immersed in a methanol solution (methanol: manufactured by Wako Pure Chemical Industries Ltd.) containing 3% by mass of a nonionic surfactant (EMULGEN 210P manufactured by Kao Corporation), and air-dried. An aluminum foil having a thickness of 20 μm is cut out into 2.0 cm×1.4 cm, and a lead tab is attached thereto. Two sheets of the aluminium foil are prepared and the cut out sample is sandwiched between the aluminium foils so that the aluminium foils are not short-circuited. The sample is impregnated with an electrolyte (manufactured by Kishida Chemical Co. Ltd.) prepared by dissolving 1 M LiBF$_4$ in a mixed solvent of propylene carbonate (PC)/ethylene carbonate (EC) (PC/EC=1/1 [mass ratio]). The resulting product is enclosed with reduced pressure in an aluminium laminate packaging in such a manner that the tab is outside the aluminium packaging. Cells thus formed are each produced such that one, two, or three sheets of separators are arranged in the aluminium foils. The cell is placed in a thermostat bath set at 20° C. to measure the resistance of the cell at an amplitude of 10 mV and a frequency of 100 kHz using an alternating current impedance method. The resistance value of the cell measured is plotted with respect to the number of the separators and the plots are approximated by a straight line to obtain the inclination. The inclination is multiplied by the electrode area of 2.0 cm×1.4 cm to obtain a membrane resistance (ohm-cm$^2$) per separator.

(6) Penetration Strength

Regarding penetration strengths of the non-aqueous secondary battery separator and the polyolefin microporous film, using KES-G5 a handy compression tester manufactured by Kato Tech Co., Ltd., penetration test was performed under conditions of a radius of curvature at the needle tip of 0.5 mm and a penetration speed of 2 mm/sec, and a maximum penetration load was defined as penetration strength. Herein, the sample was, together with a silicone rubber packing, placed and immobilized in a metal frame (sample holder) with a hole having a diameter of 11.3 mm.

(7) Tensile Strength

The tensile strengths of the non-aqueous secondary battery separator and the polyolefin microporous film were measured using a sample adjusted to 10×100 mm, by a tensile tester (RTC-1225A manufactured by A&D Co., Ltd.) under conditions of a load cell load of 5 kgf and an interchuck distance of 50 mm.

(8) Shutdown Temperature

The shutdown temperatures (SD temperature) of the non-aqueous secondary battery separator and the polyolefin microporous film were obtained by the following method.

A sample with a diameter of 19 mm was punched out and the obtained sample was immersed in a methanol solution (methanol: manufactured by Wako Pure Chemical Industries Ltd.) containing 3% by mass of a nonionic surfactant (EMULGEN 210P manufactured by Kao Corporation), and air-dried. The sample was sandwiched between SUS plates with a diameter of 15.5 mm. The sample was impregnated with an electrolyte (manufactured by Kishida Chemical Co. Ltd.) prepared by dissolving 1 M LiBF$_4$ in a mixed solvent (PC/EC=1/1 [mass ratio]) of propylene carbonate (PC)/ethylene carbonate (EC). The resulting product was enclosed in a 2032-type coin cell. A lead wire was connected to the coin cell, to which a thermocouple was attached and then the coin cell was placed in an oven. Temperature was increased at a temperature increase rate of 1.6° C./minutes and at the same time, using an alternating current impedance method, the resistance of the cell was measured at the amplitude of 10 mV and the frequency of 100 kHz. The temperature at a resistance value of 10$^3$ ohm-cm$^2$ or more was defined as shutdown temperature.

(9) Heat Shrinkage Ratio

The heat shrinkage ratios of the non-aqueous secondary battery separator and the polyolefin microporous film were measured by heating the sample at 150° C. for 1 hour. The measurement direction is a machine direction.

(10) Heat Compression Bonding Temperature

Regarding a heat compression bonding temperature of the non-aqueous secondary battery separator, the temperature of a sealer (TCW-125B manufactured by Nippon Avionics Co. Ltd.) was set to perform heat compression bonding, and the lowest temperature at which heat compression bonding was possible was defined as the temperature at which heat compression bonding is possible.

(11) Discharge Properties

The discharge properties of a non-aqueous secondary battery were evaluated by the following method.

A charging and discharging cycle of constant current-constant voltage charging at 1.6 mA and 4.2 V for 8 hours and constant current discharging at 1.6 mA and 2.75 V was performed 10 times, and a discharge capacity [mAh] obtained at the 10th cycle was defined as the discharge capacity of the battery. Next, a cycle of constant current-constant voltage charging at 1.6 mA and 4.2 V for 8 hours and constant current discharging at 16 mA and 2.75 V was performed. The capacity obtained at this time was divided by the discharge capacity of the battery at the 10th cycle and the obtained value was defined as an index of load characteristics (%).

(12) Short Circuit Resistance

The short circuit resistance of the non-aqueous secondary battery separator was performed by the following method.

After performing the discharge properties evaluation described in the above (11), the non-aqueous secondary battery was subjected to constant current-constant voltage charging at 1.6 mA and 4.2 V for 8 hours. After the charging, the battery was shaken by a shaker (MK161 manufactured by Yamato Scientific Co. Ltd) for 1 hour. Then, the voltage of the non-aqueous secondary battery was measured.

(13) Cycling Characteristics

The evaluation of discharge properties described in the above (11) was performed up to 300 cycles. A discharge capacity obtained at the 300th cycle was divided by a discharge capacity [mAh] obtained at the 10th cycle, and the obtained value was defined as an index of cycling characteristics (%).

(14) Polyethylene Content

A content of polyethylene having the molecular weight of from 200,000 to 2,000,000 contained in the polyolefin porous base material was measured by gel permeation chromatography (GPC). Specifically, to 15 mg of a sample was added 20 ml of a mobile phase for GPC measurement, and the sample was completely dissolved at 145° C. The resulting solution was filtrated through a stainless steel sintered filter (pore diameter: 1.0 μm). Next, 400 μl of the filtrate was injected into the apparatus for measurement to obtain a GPC curve under the following conditions. Then, a value S1 was obtained by integrating the GPC curve over the interval of the molecular weight of from $2.0 \times 10^5$ to $2.0 \times 10^6$, and a value S2 was obtained by integrating the GPC curve over the interval of from 0 to $4.0 \times 10^7$, and the value S1 was divided by the value S2 and multiplied by 100 to obtain the content (% by mass) of polyethylene having the molecular weight of from 200,000 to 2,000,000 in the polyolefin porous base material.

<Conditions>

Apparatus: gel permeation chromatograph ALLIANCE GPC 2000 (manufactured by Waters)

Column: TSKgel GMH6-HT×2+TSKgel GMH6-HT×2 manufactured by Tosoh Corporation

Column temperature: 140° C.

Mobile phase: o-dichlorobenzene

Detector: Differential refractive index detector (RI)

Molecular weight calibration: monodisperse polystyrene, manufactured by Tosoh Corporation Reference Example 1

As polyethylene powder, GUR 2126 (weight average molecular weight: 4,150,000; melting point: 141° C.) and GURX 143 (weight average molecular weight: 560,000; melting point: 135° C.) manufactured by Ticona Co. Ltd., were used. GUR 2126 and GURX 143 were dissolved in a mixed solvent of liquid paraffin (SMOIL P-350 manufactured by Matsumura Oil Research Corporation; boiling point: 480° C.) and decalin (manufactured by Waco Pure Chemical Industries, Ltd.; boiling point 193° C.) such that the polyethylene concentration was 30% by mass, whereby a polyethylene solution was prepared. In this case, GUR 2126 and GURX 143 were used in a ratio of 2:8 (mass ratio). The composition of the prepared polyethylene solution is as follows: polyethylene:liquid paraffin:decalin=30:67.5:2.5 (mass ratio). At this time, the content of polyethylene having the molecular weight of from 200,000 to 2,000,000 was 48% by mass.

The polystyrene solution obtained above was extruded at 148° C. from a die and cooled in a water bath to produce a gel tape (base tape). The base tape was dried at 60° C. for 8 minutes, and at 95° C. for 15 minutes. Then, the base tape was stretched by twin shaft stretching sequentially performing longitudinal stretching and transverse stretching. Here, in the longitudinal stretching, stretching magnification was 6 times and stretching temperature was 90° C., whereas in the transverse stretching, stretching magnification was 9 times and stretching temperature was 105° C. After the transverse stretching, thermal immobilization was performed at 130° C. Next, the resulting product was immersed in a methylene chloride bath to extract liquid paraffin and decalin. After that, the resulting product was dried at 50° C. and subjected to annealing treatment at 120° C. to obtain a polyolefin microporous film (porous base material). The obtained polyolefin microporous film had a structure in which fibrillar polyolefin was crossed in a mesh pattern to form pores.

Table 1 below shows measurement results of the characteristics (film thickness, Unit weight, Gurley value, porosity, membrane resistance, penetration strength, tensile strength, shutdown temperature (SD temperature), and heat shrinkage ratio) of the obtained polyolefin microporous film.

Example 1

Using the polyolefin microporous film obtained in Reference Example 1, a heat-resistant porous layer made of a heat-resistant resin was layered on both surfaces thereof to produce the non-aqueous secondary battery separator of the present invention.

Specifically, as the heat-resistant resin, polymetaphenylene isophthalamide (CONEX, manufactured by Teijin Techno Products Limited) was used. The heat-resistant resin was dissolved in a mixed solvent of dimethylacetoamide (DMAc) and tripropylene glycol (TPG) in a mass ratio of 50:50 to produce a coating slurry. The concentration of polymetaphenylene isophthalamide in the coating slurry was adjusted to 5.5% by mass. Then, two Meyer bars were opposed to each other and between the bars was placed an appropriate amount of the coating liquid. After that, the polyolefin microporous film was allowed to pass between the Meyer bars with the coating liquid to coat the front and back surfaces of the polyolefin microporous film with the coating liquid. Here, the clearance between the Meyer bars was set to 20 μm, and #6 Meyer bars were used as the two bars. The coated film was immersed in a coagulation liquid set at 40° C. containing water, DMAc, and TPG in a mass ratio of 50:25:25, washed with water and dried. As a result, on both front and back surfaces of the polyolefin microporous film was formed a heat-resistant porous layer with a thickness of 3 μm to obtain a non-aqueous secondary battery separator.

The porosity of the heat-resistant porous layer formed here was measured by the above-described method and found to be 60%.

In addition, measurements were performed regarding the characteristics (film thickness, Unit weight, Gurley value, porosity, membrane resistance, penetration strength, tensile strength, shutdown temperature (SD temperature), and heat shrinkage ratio) of the non-aqueous secondary battery separator. Table 1 below shows the results of the measurements.

The obtained non-aqueous secondary battery separator was folded in half at the center portion in a longitudinal direction as an axis, with the heat-resistant porous layer inward. On two surfaces (surfaces of the heat-resistant porous layer) facing each other in the folded state, at positions 5 mm in each in-plane direction from two sides of the axial both ends, pressurization and heating were performed along each side at the temperature, the pressure, and for the pressurizing time shown in Table 1 below, thereby performing thermal fusion.

In this manner, there was obtained a connected separator having connecting regions and formed into a pouch shape, as depicted in FIG. 2.

Also in Examples 2 to 5 below, similarly, the characteristics and the conditions for heat compression bonding of non-aqueous secondary battery separator all together were shown in Table 1 below.

Example 2

A non-aqueous secondary battery separator was obtained in the same manner as in Example 1 except for using, as coating slurry, a coating slurry prepared by dispersing α-alumina (SA-1, average particle size: 0.8 μm, manufactured by Iwatani Chemical Industry Co. Ltd.) in a polymer solution containing the above polymetaphenylene isophthalamide, DMAc, and TPG in Example 1. The coating slurry was prepared by dissolving polymetaphenylene isophthalamide at a concentration of 5.5% by mass in a mixed solvent containing DMAc and TPG in the mass ratio of 50:50 and then dispersing an inorganic filler in the obtained polymer solution. The mass ratio between polymetaphenylene isophthalamide and the inorganic filler was set to 25:75.

In the obtained non-aqueous secondary battery separator, a heat-resistant porous layer with a thickness of 3 μm was formed on both front and back surfaces of the polyolefin microporous film, and the porosity of the heat-resistant porous layer was 60%.

Using this non-aqueous secondary battery separator, in the same procedures as in Example 1 and under the conditions of thermal fusion shown in Table 1, a connected separator formed into a pouch was obtained.

Example 3

A non-aqueous secondary battery separator was produced in the same manner as in Example 1 except that α-alumina used as inorganic filler in Example 2 was replaced by magnesium hydroxide (KISUMA-5P; average particle size: 1.0 μm, manufactured by Kyowa Chemical Industry Co., Ltd), and additionally, a connected separator formed into a pouch was obtained. In the obtained non-aqueous secondary battery separator, a heat-resistant porous layer with the thickness of 3 μm was formed on both front and back surfaces of the polyolefin microporous film, and the porosity of the heat-resistant porous layer was 60%.

Example 4

A non-aqueous secondary battery separator was produced in the same manner as in Example 3 except that the clearance between the Meyer bars in Example 3 was changed from 20 μm to 50 μm. In the obtained non-aqueous secondary battery separator, a heat-resistant porous layer with a thickness of 10 μm was formed on both front and back surfaces of the polyolefin microporous film, and the porosity of the heat-resistant porous layer was 60%.

Example 5

A non-aqueous secondary battery separator was produced in the same manner as in Example 3 except that the clearance between the Meyer bars in Example 3 was changed from 20 μm to 15 μm. In the obtained non-aqueous secondary battery separator, a heat-resistant porous layer with a thickness of 1 μm was formed on both front and back surfaces of the polyolefin microporous film, and the porosity of the heat-resistant porous layer was 60%.

Example 6

Using N-methyl-pyrrolidone, 89.5 parts by mass of lithium cobaltate ($LiCoO_2$: CELLSEED C, manufactured by Nippon Chemical Industrial Co., Ltd.), which is a positive electrode active substance, 4.5 parts by mass of acetylene black (trade name: DENKA BLACK, conductive additive, manufactured by Denki Kagaku Kogyo Kabushiki Kaisha), and 6 parts by mass of polyvinylidene fluoride (KF polymer W#1100, binder, manufactured by Kureha Corporation) were kneaded together to produce a slurry. The obtained slurry was coated and dried on an aluminium foil with a thickness of 20 μm and then pressed to obtain a positive electrode with a thickness of 100 μm.

In addition, meso-phase carbon microbeads (MCMB, manufactured by Osaka Gas Chemicals Co., Ltd.), acetylene black (trade name: DENKA BLACK, manufactured by Denki Kagaku Kogyo Kabushiki Kaisha), and polyvinylidene fluoride (manufactured by Kureha Corporation) were kneaded together using N-methyl-pyrrolidone such that the mass ratio was 87:3:10 to produce a slurry. The obtained slurry was coated and dried on a copper foil with a thickness of 18 μm and then pressed to obtain a negative electrode with a thickness of 90 μm.

Next, using the pouch-shaped connected separator produced in Example 1, the positive electrode was inserted into the inside of the connected separator (the inside of the pouch from the opening portion of the connected separator (connected porous sheet)) molded into the pouch shape by thermal fusion, as depicted in FIG. 2. On one outer surface of the connected separator was stacked the negative electrode, and five battery units each having the connected separator thus formed were stacked on each other. Electrolyte was impregnated into the resulting structure and then, the structure was enclosed under reduced pressure in an outer packaging made of aluminium film to produce a non-aqueous secondary battery. Here, the produced secondary battery has a positive electrode area of 2×1.4 $cm^2$, a negative electrode area of 2.2×1.6 $cm^2$, and a set capacity of 8 mAh (a range of from 4.2 to 2.75 V).

Here, the electrolyte used was an electrolyte prepared by dissolving 1 M $LiBF_4$ in a mixed solvent of ethylene carbonate (EC) and ethyl methyl carbonate (EMC) (EC/MC=3/7 [mass ratio], manufactured by Kishida Chemical Co. Ltd.).

The characteristics (discharge capacity, load characteristics, short circuit resistance, and cycling characteristics) of the obtained non-aqueous secondary battery were measured. Table 2 below shows the measurement results.

Regarding Examples 7 to 10 and Comparative Examples 1 and 2 below, similarly, the measurement results all together are shown in Table 2 below.

Example 7

A non-aqueous secondary battery was obtained in the same manner as in Example 6 except for using the pouch-shaped connected separator obtained in Example 2 as a non-aqueous secondary battery separator in Example 6.

Example 8

A non-aqueous secondary battery was obtained in the same manner as in Example 6 except for using the pouch-shaped connected separator obtained in Example 3 as a non-aqueous secondary battery separator in Example 6.

Example 9

A non-aqueous secondary battery was obtained in the same manner as in Example 6 except for using the pouch-shaped connected separator obtained in Example 4 as a non-aqueous secondary battery separator in Example 6.

Example 10

A non-aqueous secondary battery was obtained in the same manner as in Example 6 except for using the pouch-shaped connected separator obtained in Example 5 as a non-aqueous secondary battery separator in Example 6.

Comparative Example 1

A non-aqueous secondary battery separator having no connecting region was produced in the same manner as in Example 1 except that no thermal fusion was performed in Example 1. Next, a non-aqueous secondary battery was obtained in the same manner as in Example 6 except that the pouch-shaped connected separator produced in Example 1 was replaced by the above non-aqueous secondary battery separator having no connecting region in Example 6.

Comparative Example 2

In Example 1, instead of thermal fusion, by applying an adhesive (EXTRA 2000, manufactured by Toagosei Co., Ltd.), a pouch-shaped connected separator for comparison was produced. Then, a non-aqueous secondary battery was obtained in the same manner as in Example 6 except that the pouch-shaped connected separator produced in Example 1 was replaced by the above non-aqueous secondary battery separator for comparison in Example 6.

[Measurement and Evaluation (2)]

Regarding Examples 1 to 21 below, measurements and evaluation were performed according to the following methods below, besides the measurement and evaluation methods described above.

(15) Appearance

Regarding appearance, the appearances of fused portions of produced connected separators were visually observed to evaluate the presence or absence of a tear, a wave, a unevenness, and the like.

(16) Change in Color

Regarding change in color, the appearances of fused portions of produced connected separators were visually observed to evaluate the presence or absence of yellowing before and after thermal fusion.

(17) Adhesion Strength

Regarding adhesion strength, testing according to JIS C 60068-1 was performed for produced connected separators to measure separation strength, and the measured separation strength was defined as an index for evaluation. The evaluation was performed by standardizing the measurements of Example 11 to 100 to obtain relative values.

(18) Charge and Discharge Properties

The charge and discharge properties were evaluated follows: each produced non-aqueous secondary battery was subjected to constant current-constant voltage charging at a charge voltage of 4.2 V and charge current 0.2 C, and after the charging, constant current discharging at a discharge current 0.2 C and a cut-off voltage of 2.75 V to perform charging and discharging test of the each non-aqueous secondary battery.

(19) Charge and Discharge Cycling Characteristics

Charge and discharge cycling characteristics were evaluated by performing a charge and discharge cycling test under a charge and discharge condition of setting, as 1 cycle, an operation of performing constant current-constant voltage charging at a charge voltage 4.2 V and a charge current of 1 C and constant current discharging at a discharge current of 1 C and the cut-off voltage of 2.75 V and repeating the operation for 100 cycles.

Example 11

As a heat-resistant resin, 5% by mass of polymetaphenylene isophthalamide (CONEX, manufactured by Teijin Techno Products Limited) was dissolved in a mixed solvent containing dimethylacetoamide (DMA) and tripropylene glycol (TPG) (DMA/TPG=60/40: mass ratio). In the solution was dispersed a magnesium hydroxide filler (KISUMA-5P; (average particle size: 0.8 μm), manufactured by Kyowa Chemical Industry Co., Ltd) in an amount of 4 times the mass of polymetaphenylene isophthalamide to prepare a coating liquid. The coating liquid was coated on both surfaces of a

TABLE 1

| | Microporous film | Separator | | | | |
|---|---|---|---|---|---|---|
| | Ref. Ex. 1 | Ex. 1 | Ex. 2 | Ex. 3 | Ex. 4 | Ex. 5 |
| Film thickness (μm) | 12 | 18 | 18 | 18 | 32 | 14 |
| Unit weight (g/m²) | 5.6 | 8.8 | 10.5 | 9.2 | 21.7 | 7.2 |
| Gurley value (sec.) | 150 | 320 | 310 | 300 | 560 | 250 |
| Porosity (%) | 50 | 55 | 55 | 55 | 57 | 54 |
| Membrane resistance (ohm-cm²) | 1.5 | 4.5 | 4.2 | 4.1 | 6.5 | 3.8 |
| Penetration strength ((g) | 350 | 380 | 350 | 360 | 400 | 350 |
| Tensile strength (N) | 18 | 18 | 18 | 18 | 19 | 17 |
| SD temperature (° C.) | 143 | 146 | 146 | 147 | 156 | 145 |
| Heat shrinkage ratio (%) | 18 | 3 | 2 | 2 | 1 | 8 |
| Heat compression bonding temperature (° C.) | — | 200 | 220 | 150 | 250 | 145 |
| Heat compression bonding strength (MPa) | — | 0.05 | 0.01 | 0.1 | 0.2 | 0.01 |
| Heat compression bonding time (sec.) | — | 10 | 1 | 60 | 1 | 60 |

TABLE 2

| | | Secondary battery | | | | | | |
|---|---|---|---|---|---|---|---|---|
| separator used | | Ex. 6 Ex. 1 | Ex. 7 Ex. 2 | Ex. 8 Ex. 3 | Ex. 9 Ex. 4 | Ex. 10 Ex. 5 | Comp. Ex. 1 | Comp. Ex. 2 |
| Discharge capacity | mAh | 6.8 | 6.8 | 6.8 | 6.3 | 7.2 | 6.8 | 3.2 |
| Load characteristics | % | 85 | 85 | 85 | 79 | 90 | 85 | 35 |
| Short circuit resistance | V | 4.1 | 4.1 | 4.1 | 3.5 | 4.1 | 0.2 | 1.5 |
| Cycling characteristics | % | 65 | 65 | 65 | 57 | 70 | 65 | 10 | polyethylene microporous film (TN 1601, manufactured by SK Chemicals Co., Ltd.) with a film thickness of 16 μm and then the film was immersed in a coagulation liquid. The coagulation liquid used was a mixed solvent of 30° C. including dimethylacetamide (DMA), tripropylene glycol (TPG), and water (DMA/TPG/water=18/12/70: mass ratio). Furthermore, the resulting film was washed with water and dried. In this manner, a non-aqueous secondary battery separator was produced in which a heat-resistant porous layer was formed on both surfaces of the polyethylene microporous film.

The polyethylene microporous film used for the separator had a film thickness of 16 μm and a porosity of 52%, and the total thickness of the heat-resistant porous layer on both surfaces of the film was 6 μm and the porosity thereof was 63%.

Two of separators obtained above were stacked on each other. The stacked separators were sandwiched and pressurized in an impulse-type thermal fusion apparatus from both outer surface sides thereof so as to have a thermal fusion area of width 1 cm×length 10 cm. Furthermore, thermal fusion was performed under conditions of a thermal fusion temperature of 200° C., a thermal fusion time of 7 seconds, and a thermal fusion pressure of 0.5 MPa to produce a connected separator.

As a result, favorable thermal fusion at the connecting regions was confirmed and the connecting regions had good appearances. In addition, adhesion strengths of the connecting regions were measured by the above method.

Example 12

Thermal fusion was performed in the same manner as in Example 11 except that the impulse-type thermal fusion apparatus was replaced by a hot plate press-type apparatus in Example 11.

As a result, connecting regions were found to be partially torn off or wavy, which was worse than Example 11 but appeared relatively good. This seems to be due to that while the impulse method used in Example 11 allowed instantaneous cooling to be done after thermal fusion so that the samples had cooled down enough when taken out, the hot plate press-type method was basically unable to perform instantaneous cooling. In other words, in the hot plate press-type method, the samples were taken out in the state of 200° C., which seems to have caused appearance changes.

In addition, when adhesion strength in Example 11 was defined as 100, the relative adhesion strength value was 65.

Example 13

Thermal fusion was performed in the same manner as in Example 11 except that heating was performed, not from both outer surface sides of the stacked two separators, but only from one side (lower side) in Example 11.

As a result, although thermal fusion was weaker than Example 11, fusion was confirmed. Appearances of connecting regions were good. The relative value of adhesion strength was 1 with respect to the adhesion strength 100 of Example 11. Comparison with Example 11 showed that, for the thermal fusion of such a separator, heating from both outer surface sides of the separator(s) is more effective in terms of thermal fusionability.

Example 14

Thermal fusion was performed in the same manner as in Example 11 except that the thermal fusion temperature was changed from 200° C. to 170° C. in Example 11.

As a result, fused portions were confirmed to have been favorably thermal fused and appearances of the fused portions were good. Adhesion strengths of the fused portions were measured and the relative value of the resulting adhesion strengths was 50 with respect to 100 as the adhesion strength of Example 11.

Example 15

Thermal fusion was performed in the same manner as in Example 11 except that the thermal fusion temperature was changed from 200° C. to 250° C. in Example 11.

As a result, thermal fusion at fused portions was confirmed. Observation of appearances of the fused portions showed that although the appearances were good, the fused portions were slightly yellowed. Additionally, the relative value of adhesion strengths of the fused portions was 95 with respect to 100 of the adhesion strength of Example 11.

Example 16

Thermal fusion was performed in the same manner as in Example 11 except that the thermal fusion time was changed from 7 seconds to 0.5 seconds in Example 11.

As a result, thermal fusion at fused portions was confirmed and appearances of the fused portions were good. In the measurement results of adhesion strengths of the fused portions, the relative value of adhesion strengths of the fused portions was 44 with respect to 100 of the adhesion strength of Example 11.

Example 17

Thermal fusion was performed in the same manner as in Example 11 except that the thermal fusion time was changed from 7 seconds to 60 seconds in Example 11.

As a result, thermal fusion at fused portions was confirmed, and observation of appearances of the fused portions showed that although the appearances were good, the fused portions were slightly yellowed. In addition, the relative value of adhesion strengths of the fused portions was 97 with respect to 100 of the adhesion strength of Example 11.

Example 18

Thermal fusion was performed in the same manner as in Example 11 except that the thermal fusion pressure was changed from 0.5 MPa to 0.01 MPa in Example 11.

As a result, thermal fusion at fused portions was confirmed and appearances of the fused portions were good. In addition, in the measurement results of adhesion strengths of the fused portions, the relative value of adhesion strengths of the fused portions was 45 with respect to 100 of the adhesion strength of Example 11.

Example 19

Thermal fusion was performed in the same manner as in Example 11 except that the thermal fusion pressure was changed from 0.5 MPa to 10 MPa in Example 11.

As a result, thermal fusion at fused portions was confirmed. From observation of appearances of the fused portions, the fused portions were found to be uneven. In the measurement results of adhesion strengths of the fused portions, the relative value of adhesion strengths of the fused portions was 72 with respect to 100 of the adhesion strength of Example 11.

Example 20

As a heat-resistant resin, 5% by mass of polymetaphenylene isophthalamide (CONEX, manufactured by Teijin Techno Products Limited) was dissolved in a mixed solvent containing dimethylacetoamide (DMA) and tripropylene glycol (TPG) (DMA/TPG=60/40: mass ratio). In the solution was dispersed a magnesium hydroxide filler (KISUMA-5P; (average particle size: 0.8 μm), manufactured by Kyowa Chemical Industry Co., Ltd)) in an amount of 4 times the mass of polymetaphenylene isophthalamide to prepare a coating liquid. The coating liquid was coated on one surface of a polyethylene microporous film (TN 1601, manufactured by SK Chemicals Co., Ltd.) with a film thickness of 16 μm. Then, the film was immersed in a coagulation liquid, washed with water, and dried. The coagulation liquid used was a mixed solvent of 30° C. including dimethylacetamide (DMA), tripropylene glycol (TPG), and water (DMA/TPG/water=18/12/70: mass ratio). In this manner, a non-aqueous secondary battery separator was produced in which a heat-resistant porous layer was formed on the one surface of the polyethylene microporous film.

The polyethylene microporous film used for the separator had the film thickness of 16 μm and the porosity of 52%, and the thickness of the heat-resistant porous layer was 3 μm and the porosity thereof was 60%.

Two of separators obtained above were stacked on each other. The stacked separators were sandwiched and pressurized in an impulse-type thermal fusion apparatus from both outer surface sides thereof so as to have a thermal fusion area of width 1 cm×length 10 cm. Furthermore, thermal fusion was performed under conditions of a thermal fusion temperature of 200° C., a thermal fusion time of 7 seconds, and a thermal fusion pressure of 0.5 MPa to produce a connected separator.

As a result, although the appearances of fused portions were wavy, thermal fusion at the fused portions was confirmed. The measurement results of adhesion strengths of the fused portions had a relative adhesion strength value of 89 with respect to 100 of the adhesion strength of Example 11.

Example 21

As a heat-resistant resin, 5% by mass of polymetaphenylene isophthalamide (CONEX, manufactured by Teijin Techno Products Limited) was dissolved in a mixed solvent of dimethylacetoamide (DMA) and tripropylene glycol (TPG) (DMA/TPG=60/40: mass ratio). In the solution was dispersed a magnesium hydroxide filler (KISUMA-5P; (average particle size: 0.8 μm), manufactured by Kyowa Chemical Industry Co., Ltd)) in an amount of 4 times the mass of polymetaphenylene isophthalamide to prepare a coating liquid. The coating liquid was coated on one surface of a polyethylene microporous film (TN 1601, manufactured by SK Chemicals Co., Ltd.) with the film thickness of 16 μm. Then, the film was immersed in a coagulation liquid, washed with water, and dried. The coagulation liquid used was a mixed solvent of 30° C. including dimethylacetamide (DMA), tripropylene glycol (TPG), and water (DMA/TPG/water=18/12/70: mass ratio). In this manner, a non-aqueous secondary battery separator was produced in which a heat-resistant porous layer was formed on the one surface of the polyethylene microporous film.

The polyethylene microporous film used for the separator had the film thickness of 16 μm and the porosity of 52%, and the thickness of the heat-resistant porous layer was 16 μm and the porosity thereof was 60%.

Two of separators obtained above were stacked on each other. The stacked separators were sandwiched and pressurized in an impulse-type thermal fusion apparatus from both outer surface sides thereof so as to have the thermal fusion area of width 1 cm×length 10 cm. Furthermore, thermal fusion was performed under the conditions of the thermal fusion temperature of 200° C., the thermal fusion time of 7 seconds, and the thermal fusion pressure of 0.5 MPa to produce a connected separator.

As a result, favorable thermal fusion at fused portions was confirmed, whereas the fused portions were found to be uneven. In the measurement results of adhesion strengths of the fused portions, the relative value of adhesion strengths of the fused portions was 52 with respect to 100 of the adhesion strength of Example 11.

Table 3 below shows the results of Examples 11 to 21.

TABLE 3

| | Heat-resistant porous layer | thermal fusion apparatus | Thermal fusion temperature [° C.] | Thermal fusion time [sec.] | Thermal fusion pressure [Mpa] | Appearance of fused portions | Presence or absence of color change | Adhesion strength(n.1) |
|---|---|---|---|---|---|---|---|---|
| Ex. 11 | Both surfaces (total thickness: 6 μm) | Impulse-type (both upper/lower sides) | 200 | 7 | 0.5 | A (Good) | None | 100 |
| Ex. 12 | | Hot plate press-type | 200 | 7 | 0.5 | B (partially torn off or wavy) | None | 65 |
| Ex. 13 | | Impulse-type (only lower side) | 200 | 7 | 0.5 | A (Good) | None | 1 |
| Ex. 14 | | Impulse-type (both upper/lower sides) | 170 | 7 | 0.5 | A (Good) | None | 50 |
| Ex. 15 | | Impulse-type (both upper/lower sides) | 250 | 7 | 0.5 | A (Good) | Yellowed | 95 |

TABLE 3-continued

| | Heat-resistant porous layer | thermal fusion apparatus | Thermal fusion temperature [° C.] | Thermal fusion time [sec.] | Thermal fusion pressure [Mpa] | Appearance of fused portions | Presence or absence of color change | Adhesion strength(n. 1) |
|---|---|---|---|---|---|---|---|---|
| Ex. 16 | | Impulse (both upper/lower sides) | 200 | 0.5 | 0.5 | A (Good) | None | 44 |
| Ex. 17 | | Impulse-type (both upper/lower sides) | 200 | 60 | 0.5 | A (Good) | Slightly yellowed | 97 |
| Ex. 18 | | Impulse-type (both upper/lower sides) | 200 | 7 | 0.01 | A (Good) | None | 45 |
| Ex. 19 | | Impulse-type (both upper/lower sides) | 200 | 7 | 10 | B (Uneven) | None | 72 |
| Ex. 20 | One surface (3 μm) | Impulse-type (both upper/lower sides) | 200 | 7 | 0.5 | B (Wavy) | None | 89 |
| Ex. 21 | One surface (16 μm) | Impulse-type (both upper/lower sides) | 200 | 7 | 0.5 | B (Uneven) | None | 52 |

Note 1:
Adhesion strength of Example 11 was standardized to 100.

Example 22

(1) Production of Negative Electrode

As a negative electrode active substance, 87.0 g of artificial graphite (MCMB 25-28, manufactured by Osaka Gas Chemicals Co., Ltd.), and as a conductive additive, 3.0 g of acetylene black (DENKA BLACK manufactured by Denki Kagaku Kogyo Kabushiki Kaisha) were added in a solution prepared by dissolving, as a binder, 10.0 g of polyvinylidene fluoride (KF polymer W#9300, manufactured by Kureha Corporation) in N-methyl-pyrrolidone (NMP, the same hereinafter) so as to contain 6% by mass of the binder, and then stirred by a twin arm mixer for dispersion to produce a negative electrode slurry. The negative electrode slurry was coated on a copper foil with the thickness of 20 μm as a negative electrode current collector and then the obtained coated film was dried and pressed to produce a negative electrode having the negative electrode active substance.

(2) Production of Positive Electrode

As a positive electrode active substance, 89.5 g of lithium cobaltate (CELLSEED C, manufactured by Nippon Chemical Industrial Co., Ltd.) powder, as a conductive additive, 4.5 g of acetylene black (trade name: DENKA BLACK, manufactured by Denki Kagaku Kogyo Kabushiki Kaisha), and, as a binder, polyvinylidene fluoride (KF polymer W#1100, manufactured by Kureha Corporation) in such an amount that allows 6% by mass of polyvinylidene fluoride to be contained in a solution prepared by dissolving the binder in NMP were mixed and stirred by a twin arm mixer to produce a positive electrode slurry. The positive electrode slurry was coated on an aluminium foil with the thickness of 20 μm as a positive electrode current collector and then the obtained coated film was dried and pressed to produce a positive electrode having the positive electrode active substance.

(3) Production of Separator

As a heat-resistant resin, 5% by mass of polymetaphenylene isophthalamide (CONEX, manufactured by Teijin Techno Products Limited; decomposition temperature: 200° C. or higher) was dissolved in a mixed solvent of dimethylacetoamide (DMA) and tripropylene glycol (TPG) (DMA/TPG=60/40: mass ratio). In the solution was dispersed a magnesium hydroxide filler (KISUMA-5P; (average particle size: 0.8 μm), manufactured by Kyowa Chemical Industry Co., Ltd) in an amount of 4 times the mass of polymetaphenylene isophthalamide to prepare a coating liquid. The coating liquid was coated on both surfaces of a polyethylene microporous film (TN 1601, manufactured by SK Chemicals Co., Ltd.) with the film thickness of 16 μm and then the film was immersed in a coagulation liquid, washed with water, and then dried. The coagulation liquid used was a mixed solvent of 30° C. including dimethylacetamide (DMA), tripropylene glycol (TPG), and water (DMA/TPG/water=18/12/70: mass ratio). In this manner, a non-aqueous secondary battery separator was produced in which a heat-resistant porous layer was formed on both surfaces of the polyethylene microporous film.

The polyethylene microporous film used for the separator had the film thickness of 16 μm and the porosity of 52%, and the total thickness of the heat-resistant porous layer on both surfaces of the film was 6 μm and the porosity thereof was 63%.

(4) Production of Battery

The positive electrode, the negative electrode, and the non-aqueous secondary battery separator, respectively, produced above were cut out into 10 cm×10 cm, 11 cm×11 cm, and 12.5 cm×12.5 cm, respectively. These components were stacked on each other so as to form a layered structure of positive electrode/separator/negative electrode/separator/positive electrode/separator/negative electrode/separator/positive electrode. Three of the four sides of the obtained layered body were thermal fused to each other by an impulse-type thermal fusion apparatus. Regarding conditions for thermal fusion at this time, heating was performed by sandwiching and pressurizing from the sides of both positive electrodes arranged at both ends of the layered body under the conditions of the thermal fusion temperature of 200° C., the thermal fusion time of 7 seconds, and the thermal fusion pressure of 0.5 MPa.

Then, after welding a lead tab to both the positive electrode and the negative electrode, the remaining one side was thermal fused under the same conditions. The resulting layered body was placed in aluminium laminate packaging, and an electrolyte (an electrolyte prepared by adding a mixed solvent (EC/EMC=3/7 [mass ratio]) of ethylene carbonate (EC) and ethyl methyl carbonate (EMC) to 1M LiPF$_6$) was injected therein. Then, the packaging was sealed to produce a non-aqueous secondary battery.

Using the produced non-aqueous secondary battery, a charging and discharging test was performed by the above method. As a result, an initial charge and discharge efficiency was 91%, so that discharge capacity as set in advance was obtained.

Furthermore, regarding the produced non-aqueous secondary battery, a charging and discharging test was performed by the above method and consequently, capacity maintaining ratio after 100 cycles was 93%, and therefore, good cycling characteristics were obtained. After the cycle test, the battery was disassembled to confirm the positions of the electrodes and the separators inside the battery and no significant positional shifts were observed. In addition, the separators were removed from the battery to check the adhesion state of fused portions of the separators, and consequently, good adhesion strengths at the portions were confirmed.

INDUSTRIAL APPLICABILITY

The connected porous sheet of the present invention can be suitably used, for example, as a non-aqueous secondary battery separator. When the connected porous sheet is used for a non-aqueous secondary battery separator, by controlling thermal fusion conditions, shutdown characteristics and heat resistance are provided, as well as high safety is ensured when formed into a layered structure. Therefore, there can be provided a non-aqueous secondary battery having higher safety than conventional ones.

In addition, the method for producing a connected porous sheet according to the present invention can be suitably used, for example, in production of a non-aqueous secondary battery separator. When the production method of the present invention is used to produce a non-aqueous secondary battery separator, thermal fusion of separators having heat resistance and shutdown characteristics, for example, separators provided with a heat-resistant porous layer or the like, which allows the provision of a non-aqueous secondary battery having high safety and high reliability. Particularly, the production method of the present invention can be used for large-area layered-type non-aqueous secondary batteries.

The entire disclosures of Japanese Patent Application No. 2010-245693, and Japanese Patent Application No. 2011-169610 are as a whole incorporated herein by reference.

All documents, patent applications and technical specifications recited in this specification are incorporated herein by reference in this specification to the same extent as if each individual publication, patent applications and technical standard was specifically and individually indicated to be incorporated by reference.

The invention claimed is:

1. A connected porous sheet comprising one or a plurality of porous sheets, each having: a porous base material including a polyolefin; and a heat-resistant porous layer provided on one surface or both surfaces of the porous base material and including a heat-resistant resin,
the connected porous sheet having at least one of a connecting region at which a part of the heat-resistant porous layer of the porous sheet has been connected to another part of the porous sheet by thermal fusion, or
a connecting region at which a part of a heat-resistant porous layer of a first porous sheet selected from the plurality of porous sheets has been connected to a part of a second porous sheet different from the first porous sheet by thermal fusion,
wherein when a porosity (%) and a thickness (μm) of the heat-resistant porous layer are ∈a and ta, respectively, and a porosity and a thickness (μm) of the porous base material are ∈b (%) and tb, respectively, the connected porous sheet satisfies the following formula (1):

$(\epsilon a/100) \times ta \leq [1-(\epsilon b/100)] \times tb$  Formula (1).

2. The connected porous sheet according to claim 1, wherein the heat-resistant porous layer has a thickness of from 3 to 12 μm and a porosity of from 40 to 90%.

3. The connected porous sheet according to claim 1, wherein the polyolefin includes polyethylene having a molecular weight of from 200,000 to 2,000,000.

4. The connected porous sheet according to claim 1, wherein the heat-resistant resin is a polymer having a melting point of 200° C. or higher or a polymer having no melting point but having a decomposition temperature of 200° C. or higher.

5. The connected porous sheet according to claim 1, wherein the heat-resistant porous layer is formed on both surfaces of the porous base material.

6. A non-aqueous secondary battery separator comprising the connected porous sheet according to claim 1.

7. A non-aqueous secondary battery comprising:
a plurality of battery units each including a positive electrode, a negative electrode, and the non-aqueous secondary battery separator according to claim 6, a part of which separator is arranged between the positive electrode and the negative electrode;
an outer packaging material enclosing the plurality of battery units in such a state that the battery units have been stacked on each other; and
an electrolyte containing a lithium ion, the non-aqueous secondary battery obtaining electromotive force by doping and dedoping lithium.

* * * * *